US012801062B2

(12) United States Patent
Sato et al.

(10) Patent No.: US 12,801,062 B2
(45) Date of Patent: Nov. 17, 2026

(54) LIGHT SCANNING APPARATUS AND IMAGE FORMING APPARATUS

(71) Applicant: CANON KABUSHIKI KAISHA, Tokyo (JP)

(72) Inventors: Ryota Sato, Tochigi (JP); Masayasu Teramura, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 143 days.

(21) Appl. No.: 18/888,212

(22) Filed: Sep. 18, 2024

(65) Prior Publication Data

US 2025/0110419 A1 Apr. 3, 2025

(30) Foreign Application Priority Data

Sep. 28, 2023 (JP) ................................. 2023-166649

(51) Int. Cl.

*B41J 2/47* (2006.01)
*G02B 26/12* (2006.01)
*G03G 15/04* (2006.01)
*G03G 15/043* (2006.01)

(52) U.S. Cl.

CPC .......... *G03G 15/0435* (2013.01); *B41J 2/471* (2013.01); *G02B 26/125* (2013.01); *G03G 15/04036* (2013.01)

(58) Field of Classification Search

CPC .. B41J 2/471; G02B 13/0005; G02B 26/0816; G02B 26/123; G02B 26/125; G02B 26/126; G03G 15/04036; G03G 15/0435; G03G 2215/00177

See application file for complete search history.

(56) References Cited

U.S. PATENT DOCUMENTS 9,217,863 B2 12/2015 Teramura
9,575,431 B2 2/2017 Teramura
10,539,902 B2 1/2020 Teramura
10,754,148 B2 8/2020 Teramura
10,761,450 B2 9/2020 Teramura
11,381,703 B2 * 7/2022 Miyajima ................ H04N 1/04
11,796,936 B2 10/2023 Sato
2015/0205097 A1 * 7/2015 Kudo .................. G03G 15/043 359/204.1
2023/0077901 A1 3/2023 Sato

FOREIGN PATENT DOCUMENTS

JP 2016-133777 A 7/2016

* cited by examiner

*Primary Examiner* — Anh T Vo

(74) *Attorney, Agent, or Firm* — Carter, DeLuca & Farrell LLP

(57) ABSTRACT

Provided is a light scanning apparatus including a deflecting unit configured to deflect a first light flux from a first light source to scan a first scanned surface in a main scanning direction, a first imaging optical system and a reflecting element which are configured to guide the first light flux deflected by the deflecting unit to the first scanned surface, an optical element configured to guide the first light flux emitted from the first light source to the deflecting unit, and a holding member configured to hold the deflecting unit, the first imaging optical system, the reflecting element, and the optical element, in which the optical element and the reflecting element abut against the holding member.

20 Claims, 17 Drawing Sheets

LIGHT SCANNING APPARATUS AND IMAGE FORMING APPARATUS

BACKGROUND

Technical Field

The present disclosure relates to a light scanning apparatus, and more particularly, to a light scanning apparatus suitable for use in an image forming apparatus, for example, a laser beam printer, a digital copying machine, or a multifunction printer.

Description of the Related Art

A light scanning apparatus including a plurality of holding units each holding one of a plurality of optical elements has hitherto been known.

In Japanese Patent Application Laid-Open No. 2016-133777, there is disclosed a light scanning apparatus in which a reflecting mirror for bending an optical path of a light flux deflected by a deflecting unit is held by a holding unit formed so as to be integrated with a housing.

A collimator lens for converting a light flux emitted from a light source into a parallel light flux, on the other hand, is held by a light source unit for holding the light source. The light source unit is fastened to the housing by fastening screws.

SUMMARY

According to the embodiments, there is provided a light scanning apparatus including, a deflecting unit configured to deflect a first light flux from a first light source to scan a first scanned surface in a main scanning direction, a first imaging optical system and a reflecting element which are configured to guide the first light flux deflected by the deflecting unit to the first scanned surface, an optical element configured to guide the first light flux emitted from the first light source to the deflecting unit, and a holding member configured to hold the deflecting unit, the first imaging optical system, the reflecting element, and the optical element, in which the optical element and the reflecting element abut against the holding member.

Further features of the present disclosure will become apparent from the following description of exemplary embodiments with reference to the attached drawings.

DESCRIPTION OF THE EMBODIMENTS

A light scanning apparatus according to the present embodiments is described in detail below with reference to the accompanying drawings. Some of the drawings referred to below may be drawn in scales different from the actual scale for easier understanding of the present disclosure.

In the following description, a main scanning direction refers to a direction perpendicular to a rotational axis of a deflecting unit 50 and to optical axes of first to fourth imaging optical systems (a direction in which a light flux is deflected by the deflecting unit 50).

A sub-scanning direction refers to a direction parallel to the rotational axis of the deflecting unit 50. A main scanning cross section refers to a cross section perpendicular to the sub-scanning direction. A sub-scanning cross section refers to a cross section perpendicular to the main scanning direction.

In the following, an optical axis direction of the first to fourth imaging optical systems, the main scanning direction, and the sub-scanning direction are defined as an X-direction, a Y-direction, and a Z-direction, respectively.

The X-direction may also be defined as a direction (first direction) parallel to a straight line running through a first intersection between a first scanned surface 100*a* and the optical axis of the first imaging optical system, and through a second intersection between a second scanned surface 100*b* and the optical axis of the second imaging optical system.

First Embodiment

Figure 1A:
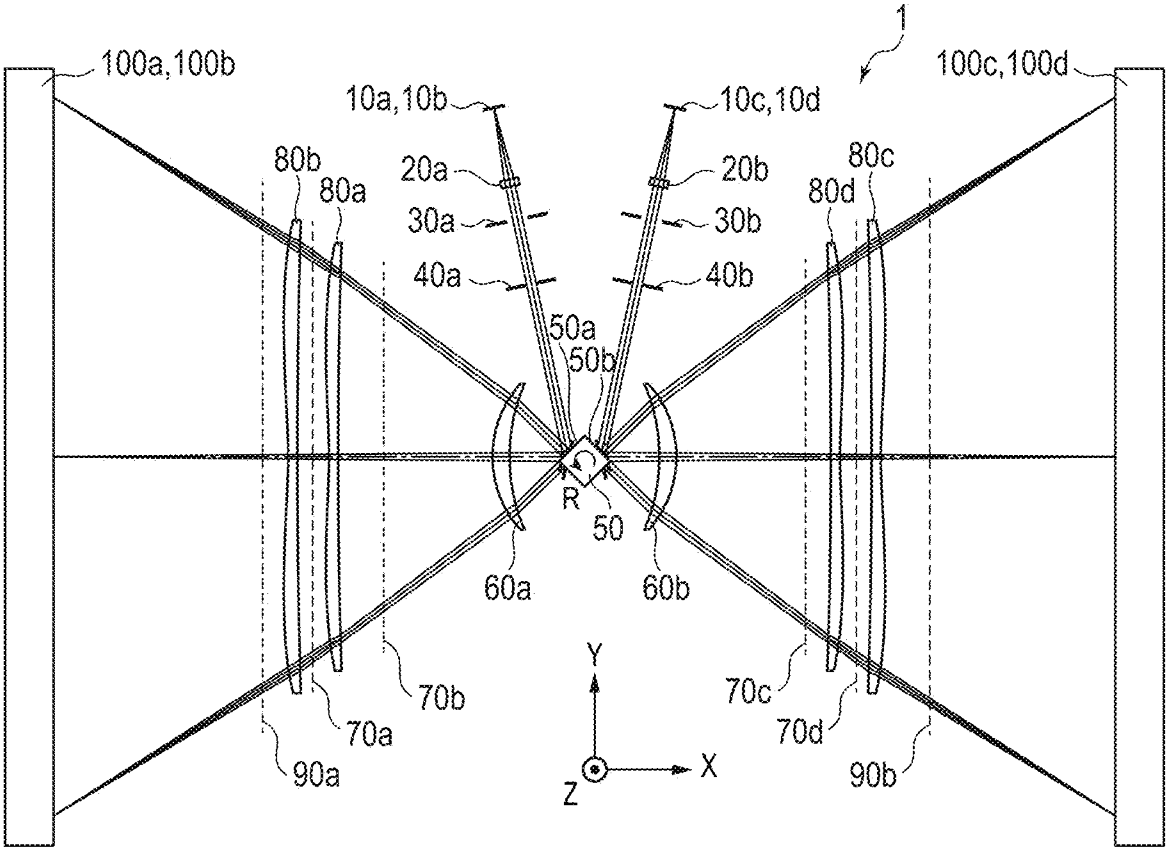
FIG. 1A is a developed view in a main scanning cross section of a light scanning apparatus according to a first embodiment of the present invention.
Figure 1B:
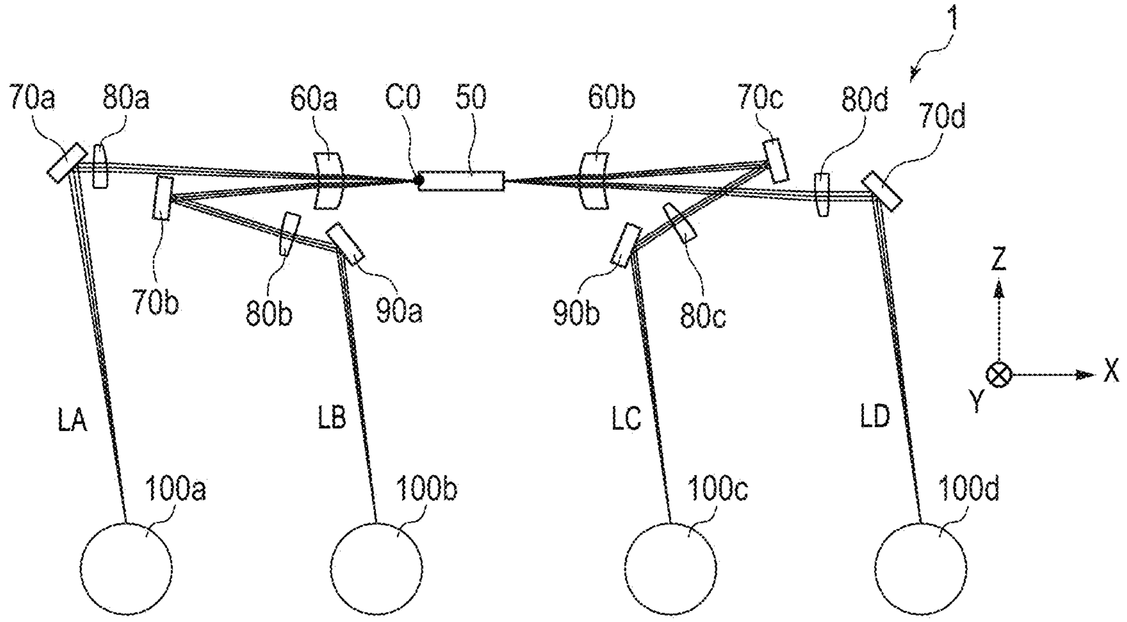
FIG. 1B is a partial sub-scanning cross sectional view of the light scanning apparatus according to the first embodiment.

FIG. 1A and FIG. 1B show a developed view in a main scanning cross section and a partial sub-scanning cross sectional view, respectively, of a light scanning apparatus 1 according to a first embodiment of the present invention.

In FIG. 1A, first reflecting elements (reflecting optical elements) 70*a*, 70*b*, 70*c*, and 70*d* and second reflecting elements (reflecting optical elements) 90*a* and 90*b* are indicated by broken lines.

The light scanning apparatus 1 according to the present embodiment includes a housing 2 (a holding member) and first, second, third, and fourth light sources 10*a*, 10*b*, 10*c*, and 10*d*, as well as first and second incident optical elements 20*a* and 20*b* (refractive optical elements).

The light scanning apparatus 1 according to the present embodiment also includes first and second sub-scanning stops 30*a* and 30*b*, first and second main scanning stops 40*a* and 40*b*, and the deflecting unit 50.

The light scanning apparatus 1 according to the present embodiment also includes first imaging optical elements 60*a* and 60*b*, the first reflecting elements 70*a* to 70*d*, second imaging optical elements 80*a*, 80*b*, 80*c*, and 80*d*, and the second reflecting elements 90*a* and 90*b*.

The housing 2 is configured so as to hold and simultaneously house the optical elements provided in the light scanning apparatus 1 according to the present embodiment.

The first to fourth light sources 10*a* to 10*d* are each a light source, such as a semiconductor laser, with two light emitting points. That is, the light scanning apparatus 1 according to the present embodiment is provided with eight light emitting points in total.

The first light source 10*a* and the second light source 10*b* are placed in the same position in the main scanning cross section, whereas being placed in positions different from each other in the sub-scanning direction.

The third light source 10*c* and the fourth light source 10*d* are placed in the same position in the main scanning cross section, whereas being placed in positions different from each other in the sub-scanning direction.

The first and second incident optical elements 20*a* and 20*b* are formed from anamorphic lenses having magnitudes of refractive power that differ in the main scanning cross section and a sub-scanning cross section.

The first incident optical element 20*a* converts degrees of convergence of first and second light fluxes LA and LB emitted from the first and second light sources 10*a* and 10*b*, respectively, so that the first and second light fluxes LA and LB become parallel light fluxes in the main scanning direction.

Similarly, the second incident optical element 20*b* converts degrees of convergence of third and fourth light fluxes LC and LD emitted from the third and fourth light sources 10*c* and 10*d*, respectively, so that the third and fourth light fluxes LC and LD become parallel light fluxes in the main scanning direction.

It is assumed that the parallel light flux here includes not only a strict parallel light flux but also substantially parallel light fluxes including a weak divergent light flux and a weak convergent light flux.

The first incident optical element 20*a* condenses the first and second light fluxes LA and LB emitted from the first and second light sources 10*a* and 10*b*, respectively, toward the deflecting unit 50 in the sub-scanning direction.

Similarly, the second incident optical element 20*b* condenses the third and fourth light fluxes LC and LD emitted from the third and fourth light sources 10*c* and 10*d*, respectively, toward the deflecting unit 50 in the sub-scanning direction.

Detailed configurations of the first incident optical element 20*a* and the second incident optical element 20*b* are described later.

The first sub-scanning stop 30*a* includes a lower aperture portion 30*al* (first aperture portion) and an upper aperture portion 30*au* (second aperture portion) which have a quadrangular shape to regulate, in the sub-scanning direction, light flux widths of the first and second light fluxes LA and LB having traveled through the first incident optical element 20*a*.

Similarly, the second sub-scanning stop 30*b* includes two aperture portions which have a quadrangular shape to regulate, in the sub-scanning direction, light flux widths of the third and fourth light fluxes LC and LD having traveled through the second incident optical element 20*b*.

The first main scanning stop 40*a* includes a single aperture portion which has a quadrangular shape to regulate, in the main scanning direction, light flux widths of the first and second light fluxes LA and LB having traveled through the first sub-scanning stop 30*a*.

Similarly, the second main scanning stop 40*b* includes a single aperture portion which has a quadrangular shape to regulate, in the main scanning direction, light flux widths of the third and fourth light fluxes LC and LD having traveled through the second sub-scanning stop 30*b*.

The deflecting unit 50 is a polygon mirror (rotary polygon mirror) having four deflecting surfaces, and is driven by a driving unit (not shown) such as a motor to rotate at a constant speed in a direction of an arrow R indicated in FIG. 1A.

The first imaging optical elements 60*a* and 60*b* and the second imaging optical elements 80*a* to 80*d* are fθ lenses (scanning lenses) having fθ characteristics.

The first imaging optical element 60*a* and the second imaging optical element 80*a* condense (guide) the first light flux LA deflected by the deflecting unit 50, to a scanning region (an image forming region) of the first scanned surface 100*a*, to thereby form a spot image on the scanning region.

The first imaging optical element 60*a* and the second imaging optical element 80*b* condense (guide) the second light flux LB deflected by the deflecting unit 50, to a scanning region of the second scanned surface 100*b*, to thereby form a spot image on the scanning region.

The first imaging optical element 60*b* and the second imaging optical element 80*c* condense (guide) the third light flux LC deflected by the deflecting unit 50, to a scanning region of a third scanned surface 100*c*, to thereby form a spot image on the scanning region.

The first imaging optical element 60*b* and the second imaging optical element 80*d* condense (guide) the fourth light flux LD deflected by the deflecting unit 50, to a scanning region of a fourth scanned surface 100*d*, to thereby form a spot image on the scanning region.

The first reflecting elements 70*a* to 70*d* and the second reflecting elements 90*a* and 90*b* are long mirrors with no refractive power which bend, in the sub-scanning cross section, optical paths of the first to fourth light fluxes LA to LD deflected by the deflecting unit 50.

The first and second incident optical elements 20*a* and 20*b* provided in the light scanning apparatus 1 according to the present embodiment are molded lenses formed by injection molding of a plastic material (resin material).

Similarly, the first imaging optical elements 60*a* and 60*b* and the second imaging optical elements 80*a* to 80*d* are molded lenses formed by injection molding of a plastic material (resin material).

However, those elements are not limited thereto, and may be molded lenses that are formed by injection molding of a glass material.

In the light scanning apparatus 1 according to the present embodiment, the use of molded lenses which are easy to form an optical surface having an aspherical shape and which are suitable for mass production can improve productivity and optical performance.

The first reflecting elements 70*a* to 70*d* and the second reflecting elements 90*a* and 90*b* provided in the light scanning apparatus 1 according to the present embodiment are long mirrors created by forming films as reflecting surfaces on general long pieces of glass, but are not limited thereto.

That is, the first and second reflecting elements may be long mirrors that are created by forming films as reflecting surfaces on members formed through injection molding of a plastic material, or long mirrors that are created by performing mirror-like finishing on metal members such as aluminum members.

In the light scanning apparatus 1 according to the present embodiment, the reflecting surfaces possessed by those are formed so as to have a flat shape with no refractive power, but are not limited thereto and may be formed so as to have spherical or other curved surface shapes.

The first and second light fluxes LA and LB emitted from the first and second light sources 10*a* and 10*b*, respectively, are converted into parallel light fluxes in the main scanning cross section, and are also condensed in the sub-scanning cross section, by the first incident optical element 20*a*.

After having traveled through the first incident optical element 20*a*, the first and second light fluxes LA and LB travel through the first sub-scanning stop 30*a* and the first main scanning stop 40*a*, and are then guided to a first deflecting surface 50*a* of the deflecting unit 50.

The first and second light fluxes LA and LB are thus regulated in light flux width in the main scanning direction and the sub-scanning direction, and are condensed in the sub-scanning direction so that a long line image is formed in the main scanning direction in the vicinity of the first deflecting surface 50*a* of the deflecting unit 50.

The third and fourth light fluxes LC and LD emitted from the third and fourth light sources 10*c* and 10*d*, respectively, are converted into parallel light fluxes in the main scanning cross section, and are also condensed in the sub-scanning cross section, by the second incident optical element 20*b*.

After having traveled through the second incident optical element 20*b*, the third and fourth light fluxes LC and LD travel through the second sub-scanning stop 30*b* and the second main scanning stop 40*b*, and are then guided to a second deflecting surface 50*b* of the deflecting unit 50.

The third and fourth light fluxes LC and LD are thus regulated in light flux width in the main scanning direction and the sub-scanning direction, and are condensed in the sub-scanning direction so that a long line image is formed in the main scanning direction in the vicinity of the second deflecting surface 50*b* of the deflecting unit 50.

In the light scanning apparatus 1 according to the present embodiment, the first and second light fluxes LA and LB emitted from the first and second light sources 10*a* and 10*b*, respectively, are obliquely incident on the first deflecting surface 50*a* of the deflecting unit 50 at angles different from each other with respect to the main scanning cross section in the sub-scanning cross section.

Specifically, the first and second light fluxes LA and LB are obliquely incident on the first deflecting surface 50*a* of the deflecting unit 50 at angles of −2.70° and +2.70°, respectively, with respect to the main scanning cross section.

The third and fourth light fluxes LC and LD emitted from the third and fourth light sources 10*c* and 10*d*, respectively, are obliquely incident on the second deflecting surface 50*b* of the deflecting unit 50 at angles different from each other with respect to the main scanning cross section in the sub-scanning cross section.

Specifically, the third and fourth light fluxes LC and LD are obliquely incident on the second deflecting surface 50*b* of the deflecting unit 50 at angles of −2.70° and +2.70°, respectively, with respect to the main scanning cross section.

Next, the first and second light fluxes LA and LB deflected by the first deflecting surface 50*a* of the deflecting unit 50 are condensed onto the first and second scanned surfaces 100*a* and 100*b*, respectively, by the first imaging optical element 60*a* and by the second imaging optical elements 80*a* and 80*b*, respectively.

The third and fourth light fluxes LC and LD deflected by the second deflecting surface 50*b* of the deflecting unit 50 are condensed onto the third and fourth scanned surfaces 100*c* and 100*d*, respectively, by the first imaging optical element 60*b* and by the second imaging optical elements 80*c* and 80*d*, respectively.

Rotation of the deflecting unit 50 causes the first to fourth scanned surfaces 100*a* to 100*d* to be optically scanned with the first to fourth light fluxes LA to LD, respectively, in the main scanning direction at a uniform speed, to thereby allow images to be recorded on the first to fourth scanned surfaces 100*a* to 100*d*.

In the light scanning apparatus 1 according to the present embodiment, a synchronization detection optical system (not shown) is provided in order to determine writing start timing at which optical scanning on the first to fourth scanned surfaces 100*a* to 100*d* is to be started.

Specifically, a predetermined light flux deflected by the deflecting unit 50 to a predetermined direction is guided by a lens for synchronization detection (not shown) to a sensor for synchronization detection (not shown).

A synchronization detection signal (beam detection (BD) signal) acquired by detection of a signal output from the sensor for synchronization detection is used to determine light emission timing of each of the first to fourth light sources 10*a* to 10*d*.

In the light scanning apparatus 1 according to the present embodiment, a first incident optical system is formed from a lower portion 21*al* (first refractive optical portion) of the first incident optical element 20*a* in the sub-scanning direction, the lower aperture portion 30*al* of the first sub-scanning stop 30*a*, and the aperture portion of the first main scanning stop 40*a*.

A second incident optical system is formed from an upper portion 21*au* (second refractive optical portion) of the first incident optical element 20*a* in the sub-scanning direction, the upper aperture portion 30*au* of the first sub-scanning stop 30*a*, and the aperture portion of the first main scanning stop 40*a*.

A third incident optical system is formed from a lower portion of the second incident optical element 20*b* in the sub-scanning direction, the lower aperture portion of the second sub-scanning stop 30*b*, and the aperture portion of the second main scanning stop 40*b*.

A fourth incident optical system is formed from an upper portion of the second incident optical element 20*b* in the sub-scanning direction, the upper aperture portion of the second sub-scanning stop 30*b*, and the aperture portion of the second main scanning stop 40*b*.

In the light scanning apparatus 1 according to the present embodiment, the first imaging optical system is formed from an upper portion of the first imaging optical element 60*a* in the sub-scanning direction and the second imaging optical element 80*a*.

The second imaging optical system is formed from a lower portion of the first imaging optical element 60*a* in the sub-scanning direction and the second imaging optical element 80*b*.

The third imaging optical system is formed from an upper portion of the first imaging optical element 60*b* in the sub-scanning direction and the second imaging optical element 80*c*.

The fourth imaging optical system is formed from a lower portion of the first imaging optical element 60*b* in the sub-scanning direction and the second imaging optical element 80*d*.

Next, specification values of the light scanning apparatus 1 according to the present embodiment, refractive indices and coordinates of the respective optical elements, and shapes of optical surfaces of the respective optical elements are shown in Table 1, Table 2, and Table 3-1 and Table 3-2, respectively.

In Table 2, Table 3-1, and Table 3-2, information about only the first and second incident optical systems and the first and second imaging optical systems is shown.

That is, in Table 2, Table 3-1, and Table 3-2, information about the third and fourth incident optical systems and the third and fourth imaging optical systems is omitted.

TABLE 1

| Item | Parameter · Unit | Value |
|---|---|---|
| Wavelength used by first to fourth light sources 10a to 10d | λ [nm] | 790 |
| Scanning width of first to fourth scanned surfaces 100a to 100d | h [nm] | 326 |
| Number of deflecting surfaces of deflecting unit 50 | [Surface] | 4 |
| Circumscribed circle diameter of deflecting unit 50 | Pd [mm] | 20 |
| Maximum scanning angle of deflecting unit 50 | θmax [rad] | 0.787 |
| Rotation center coordinates of deflecting unit 50 | (X, Y) [mm] | (6.03, −3.79) |
| Absolute value of incident angle of first to fourth incident optical systems in main scanning cross section | θim [deg] | 78.00 |
| Absolute value of incident angle of first to fourth incident optical systems in sub-scanning cross section | θis [deg] | 2.70 |
| Width of respective aperture portions of first and second sub-scanning stops 30a and 30b in sub-scanning direction | As [mm] | 2.84 |
| Width of respective aperture portions of first and second main scanning stops 40a and 40b in main scanning direction | Am [mm] | 3.75 |
| Distance in X-direction between on-axis deflection point C0 and centers of exit surfaces of first and second incident optical elements 20a and 20b | Lx [mm] | 25.98 |
| Distance in Y-direction between on-axis deflection point C0 and centers of exit surfaces of first and second incident optical elements 20a and 20b | Ly [mm] | 122.24 |
| Distance in XY cross section between onn-axis deflection point C0 and centers of exit surfaces of first and second incident optical elements 20a and 20b | Lt [mm] | 125.11 |
| Distance in optical axis direction of first to fourth incident optical systems between first to fourth light sources 10a to 10d and on-axis deflection point C0 | Li [mm] | 161.70 |
| Distance in X-direction between on-axis deflection point C0 and centers of reflecting surfaces of second reflecting elements 90a and 90b | Mx [mm] | 27.55 |
| Distance in Y-direction between on-axis deflection point C0 and centers of reflecting surfaces of second reflecting elements 90a and 90b | My [mm] | 116.50 |

TABLE 2

| Surface number | | Surface interval [mm] | Refractive index (λ = 790 nm) | Coordinates of surface vertex tc(x) | tc(y) | tc(z) | Direction cosine of optical axis gx(x) | gx(y) | gx(z) |
|---|---|---|---|---|---|---|---|---|---|
| 1 | First light source 10a | 0.250 | 1.000 | −33.582 | 157.991 | −7.617 | −0.208 | 0.977 | −0.047 |
| 2 | Glass cover for laser chip | 33.340 | 1.511 | −33.530 | 157.747 | −7.605 | −0.208 | 0.977 | −0.047 |
| 3 | Incident surface of lower portion 21al of first | 3.000 | 1.528 | −26.606 | 125.171 | −6.035 | −0.208 | 0.977 | −0.047 |

TABLE 2-continued

| | | | | | | | | | |
|---|---|---|---|---|---|---|---|---|---|
| | incident optical element 20a | | | | | | | | |
| 4 | Exit surface of lower portion 21al of first incident optical element 20a | 15.150 | 1.000 | −25.983 | 122.240 | −5.893 | −0.208 | 0.977 | −0.047 |
| 5 | Lower aperture portion 30al of first sub-scanning stop 30a | 29.870 | 1.000 | −22.837 | 107.438 | −5.180 | −0.208 | 0.978 | 0.000 |
| 6 | Aperture portion of first main scanning stop 40a | 80.090 | 1.000 | −16.633 | 78.253 | −3.773 | −0.208 | 0.978 | 0.000 |
| 7 | First deflecting surface 50a of deflecting unit 50 (in on-axis image height scanning) | 26.000 | 1.000 | 0.535 | 0.660 | 0.000 | −0.777 | 0.629 | 0.000 |
| 8 | Incident surface of upper portion 61a of first imaging optical element 60a | 8.200 | 1.528 | −26.000 | 0.000 | 0.000 | −1.000 | 0.000 | 0.000 |
| 9 | Exit surface of upper portion 61a of first imaging optical element 60a | 69.300 | 1.000 | −34.200 | 0.000 | 0.000 | −1.000 | 0.000 | 0.000 |
| 11 | Incident surface of second imaging optical element 80a | 4.300 | 1.528 | −103.500 | 0.000 | 5.030 | −1.000 | 0.000 | 0.000 |
| 12 | Exit surface of second imaging optical element 80a | 10.670 | 1.000 | −107.800 | 0.000 | 5.030 | −1.000 | 0.000 | 0.000 |
| 13 | Reflecting surface of first reflecting element 70a | 114.530 | 1.000 | −114.192 | 5.000 | 4.980 | −0.759 | 0.000 | 0.652 |
| 14 | First scanned surface 100a | — | 1.000 | −97.695 | 0.000 | −112.686 | −0.151 | 0.000 | 0.989 |

| Surface | | Surface interval; | Refractive index (λ = 790 | Coordinates of surface vertex | | | Direction cosine of optical axis | | |
|---|---|---|---|---|---|---|---|---|---|
| number | | [mm] | nm) | tc(x) | tc(y) | tc(z) | gx(x) | gx(y) | gx(z) |
| 1 | Second light source 10b | 0.250 | 1.000 | −33.582 | 157.991 | 7.617 | −0.208 | 0.977 | 0.047 |
| 2 | Glass cover for laser chip | 33.340 | 1.511 | −33.530 | 157.747 | 7.605 | −0.208 | 0.977 | 0.047 |
| 3 | Incident surface of upper portion 21au of first incident optical element 20a | 3.000 | 1.528 | −26.606 | 125.171 | 6.035 | −0.208 | 0.977 | 0.047 |
| 4 | Exit surface of lower portion 21au of first incident | 15.150 | 1.000 | −25.983 | 122.240 | 5.893 | −0.208 | 0.977 | 0.047 |

TABLE 2-continued

| | | | | | | | | | |
|---|---|---|---|---|---|---|---|---|---|
| | optical element 20a | | | | | | | | |
| 5 | Upper aperture portion 30au of first sub-scanning stop 30a | 29.870 | 1.000 | −22.837 | 107.438 | 5.180 | −0.208 | 0.978 | 0.000 |
| 6 | Aperture portion of first main scanning stop 40a | 80.090 | 1.000 | −16.633 | 78.253 | 3.773 | −0.208 | 0.978 | 0.000 |
| 7 | First deflecting surface 50a of deflecting unit 50 (in on-axis image height scanning) | 26.000 | 1.000 | 0.535 | 0.660 | 0.000 | −0.777 | 0.629 | 0.000 |
| 8 | Incident surface of lower portion 62a of first imaging optical element 60a | 8.200 | 1.528 | −26.000 | 0.000 | 0.000 | −1.000 | 0.000 | 0.000 |
| 9 | Exit surface of upper portion 62a of first imaging optical element 60a | 48.348 | 1.000 | −34.200 | 0.000 | 0.000 | −1.000 | 0.000 | 0.000 |
| 10 | Reflecting surface of first reflecting element 70b | 39.452 | 1.000 | −83.252 | 0.000 | −5.275 | −0.991 | 0.000 | 0.132 |
| 11 | Incident surface of second imaging optical element 80b | 4.300 | 1.528 | −46.366 | 0.000 | −17.300 | −0.965 | 0.000 | 0.262 |
| 12 | Exit surface of second imaging optical element 80b | 4.523 | 1.000 | −42.216 | 0.000 | −18.427 | −0.965 | 0.000 | 0.262 |
| 13 | Reflecting surface of second reflecting element 90a | 102.177 | 1.000 | −27.554 | −3.500 | −21.926 | −0.741 | 0.000 | −0.672 |
| 14 | Second scanned surface 100b | — | 1.000 | −14.695 | 0.000 | −112.686 | 0.167 | 0.000 | −0.986 |

TABLE 3-1

| | Aspherical coefficient | | | | | | |
|---|---|---|---|---|---|---|---|
| | | Lower portion 21al of first incident optical element 20a | | Upper portion 61a of first imaging optical element 60a | | Second imaging optical element 80a | |
| | Coefficient | Incident surface | Exit surface | Incident surface | Exit surface | Incident surface | Exit surface |
| Meridional line | R | — | −3.717E+01 | −7.110E+01 | −4.295E+01 | 4.000E+03 | 3.501E+02 |
| | K | — | — | 9.464E−01 | −5.155E−01 | — | −8.753E+01 |
| | B3 | — | — | — | — | — | — |
| | B4 | — | | −9.147E−07 | −3.477E−07 | — | −2.020E−07 |
| | B5 | — | — | — | — | — | — |
| | B6 | — | — | 6.784E−09 | 1.690E−09 | — | 1.609E−11 |
| | B7 | — | — | — | — | — | — |

TABLE 3-1-continued

| | | Aspherical coefficient | | | | | |
|---|---|---|---|---|---|---|---|
| | | Lower portion 21al of first incident optical element 20a | | Upper portion 61a of first imaging optical element 60a | | Second imaging optical element 80a | |
| | Coefficient | Incident surface | Exit surface | Incident surface | Exit surface | Incident surface | Exit surface |
| | B8 | — | — | −5.767E−12 | 1.110E−12 | — | −9.313E−16 |
| | B9 | — | — | — | — | — | — |
| | B10 | — | — | 1.638E−15 | −1.224E−15 | — | 2.524E−20 |
| Sagittal line | r | — | −2.617E+01 | 2.000E+01 | 2.500E+01 | 3.708E+01 | −1.540E+02 |
| | E1 | — | — | — | — | — | −1.278E−07 |
| | E2 | — | — | — | 1.522E−05 | −7.458E−07 | 1.813E−06 |
| | E3 | — | — | — | — | — | −3.240E−09 |
| | E4 | — | — | — | 8.486E−10 | — | −3.041E−10 |
| | E5 | — | — | — | — | — | 1.339E−12 |
| | E6 | — | — | — | −2.508E−11 | — | 3.082E−14 |
| | E7 | — | — | — | — | — | −2.009E−16 |
| | E8 | — | — | — | 7.607E−15 | — | −1.954E−18 |
| | E9 | — | — | — | — | — | 9.859E−21 |
| | E10 | — | — | — | 1.610E−17 | — | 5.812E−23 |
| Additional term | M0_1 | — | — | — | −2.124E−02 | −1.007E−01 | 2.315E−02 |
| | M1_1 | — | — | — | — | −2.129E−04 | −2.002E−04 |
| | M2_1 | — | — | — | 3.321E−05 | −1.314E−05 | −2.370E−05 |
| | M3_1 | — | — | — | — | 1.161E−07 | 1.056E−07 |
| | M4_1 | — | — | — | — | 1.765E−09 | 3.675E−09 |
| | M5_1 | — | — | — | — | −1.616E−11 | −1.409E−11 |
| | M6_1 | — | — | — | — | 3.014E−13 | −3.052E−13 |
| | M7_1 | — | — | — | — | 1.061E−15 | 9.733E−16 |
| | M8_1 | — | — | — | — | −1.306E−17 | 6.574E−17 |
| | M9_1 | — | — | — | — | −1.657E−20 | −1.728E−20 |
| | M10_1 | — | — | — | — | −8.536E−22 | −3.960E−21 |
| | C3 | −8.669E−03 | — | — | — | — | — |
| | C5 | −7.847E−03 | — | — | — | — | — |

TABLE 3-2

| | | Aspherical coefficient | | | | | |
|---|---|---|---|---|---|---|---|
| | | Upper portion 21au of first incident optical element 20a | | Lower portion 62a of first imaging optical element 60a | | Second imaging optical element 80b | |
| | Coefficient | Incident surface | Exit surface | Incident surface | Exit surface | Incident surface | Exit surface |
| Meridional line | R | — | −3.717E+01 | −7.110E+01 | −4.380E+01 | 4.000E+03 | −3.800E+02 |
| | K | — | — | 9.464E−01 | −9.321E−01 | — | −7.412E+01 |
| | B3 | — | — | — | — | — | — |
| | B4 | — | — | −9.147E−07 | −1.355E−06 | — | 1.332E−07 |
| | B5 | — | — | — | — | — | — |
| | B6 | — | — | 6.784E−09 | 1.719E−09 | — | −7.206E−12 |
| | B7 | — | — | — | — | — | — |
| | B8 | — | — | −5.767E−12 | 8.761E−13 | — | 3.070E−16 |
| | B9 | — | — | — | — | — | — |
| | B10 | — | — | 1.638E−15 | −1.069E−15 | — | −6.089E−21 |
| Sagittal line | r | — | −2.617E+01 | 2.000E+01 | 5.526E+01 | −3.743E+01 | 2.500E+02 |
| | E1 | — | — | — | — | — | −9.410E−09 |
| | E2 | — | — | — | 6.894E−06 | 3.482E−07 | −1.446E−06 |
| | E3 | — | — | — | — | — | 1.616E−09 |
| | E4 | — | — | — | 8.425E−08 | — | 2.793E−10 |
| | E5 | — | — | — | — | — | −4.721E−13 |
| | E6 | — | — | — | −2.679E−10 | — | −4.455E−14 |
| | E7 | — | — | — | — | — | 5.354E−17 |
| | E8 | — | — | — | 3.436E−13 | — | 3.936E−18 |
| | E9 | — | — | — | — | — | −2.027E−21 |
| | E10 | — | — | — | −1.539E−16 | — | −1.363E−22 |
| Additional term | M0_1 | — | — | — | 7.661E−02 | −1.211E−01 | 5.801E−02 |
| | M1_1 | — | — | — | — | −2.129E−04 | −2.002E−04 |
| | M2_1 | — | — | — | −3.906E−05 | −1.111E−05 | −2.292E−05 |
| | M3_1 | — | — | — | — | 1.419E−07 | 1.288E−07 |
| | M4_1 | — | — | — | — | 5.557E−10 | 2.627E−09 |
| | M5_1 | — | — | — | — | −2.589E−11 | −2.174E−11 |
| | M6_1 | — | — | — | — | 2.459E−13 | −2.067E−13 |

TABLE 3-2-continued

| | Aspherical coefficient | | | | | |
|---|---|---|---|---|---|---|
| | Upper portion 21au of first incident optical element 20a | | Lower portion 62a of first imaging optical element 60a | | Second imaging optical element 80b | |
| Coefficient | Incident surface | Exit surface | Incident surface | Exit surface | Incident surface | Exit surface |
| M7_1 | — | — | — | — | 2.150E−15 | 1.675E−15 |
| M8_1 | — | — | — | — | −1.182E−17 | 3.209E−17 |
| M9_1 | — | — | — | — | −6.130E−20 | −4.199E−20 |
| M10_1 | — | — | — | — | −9.717E−23 | −1.487E−21 |
| C3 | −8.669E−03 | — | — | — | — | — |
| C5 | −7.847E−03 | — | — | — | — | — |

The upper portion 21*au* and the lower portion 21*al* of the first incident optical element 20*a* and the upper portion and the lower portion of the second incident optical element 20*b* which are provided in the light scanning apparatus 1 according to the present embodiment each have an incident surface that is a diffractive surface with a diffraction grating formed therein.

The first and second incident optical elements 20*a* and 20*b* are formed by injection molding that uses a plastic material as described above.

The light scanning apparatus 1 accordingly employs a so-called temperature-compensated optical system in which changes in refractive power of the first and second incident optical elements 20*a* and 20*b* due to environmental variation are compensated with changes in diffractive power of the diffractive surface that accompany changes in wavelength of the first to fourth light fluxes LA to LD in the first to fourth light sources 10*a* to 10*d*.

Specifically, the diffractive surface formed as the incident surface of each of the upper portion 21*au* and the lower portion 21*al* of the first incident optical element 20*a* and the upper portion and the lower portion of the second incident optical element 20*b* is defined by a phase function expressed by Expression (1) below.

$$\phi = \frac{2\pi M}{\lambda}\left(C_3 Z^2 \times C_5 Y^2\right) \tag{1}$$

In Expression (1), ϕ represents the phase function, M represents order of diffraction, and λ represents a design wavelength and, because the light scanning apparatus 1 according to the present embodiment uses first-order diffraction light, M is 1 and λ is 790 nm.

The first imaging optical elements 60*a* and 60*b* and the second imaging optical elements 80*a* to 80*d* provided in the light scanning apparatus 1 according to the present embodiment have incident surfaces and exit surfaces each of which has a shape in the main scanning cross section (a meridional shape) which is an aspherical shape expressed by a tenth-order polynomial function.

Specifically, in each of the first imaging optical elements 60*a* and 60*b* and the second imaging optical elements 80*a* to 80*d*, an intersection (surface vertex) between an optical surface and an optical axis is set as an origin.

On each optical surface, a direction parallel to the optical axis, an axis perpendicular to the optical axis in the main scanning cross section, and an axis perpendicular to the optical axis in the sub-scanning cross section are set as an X-axis, a Y-axis, and a Z-axis, respectively.

In this case, the aspherical shape in the main scanning cross section of each of the incident surfaces and the exit surfaces of the first imaging optical elements 60*a* and 60*b* and the second imaging optical elements 80*a* to 80*d* is expressed by Expression (2) below.

$$X = \frac{\frac{Y^2}{R}}{1 + \sqrt{1 - (1+K)\left(\frac{Y}{R}\right)^2}} + \sum_{i=1}^{10} B_i Y^i \tag{2}$$

In Expression (2), R represents a curvature radius (meridional curvature radius) in the main scanning cross section, K represents an eccentricity, and $B_i$ represents an aspherical coefficient.

A shape in the sub-scanning cross section (a sagittal shape) of each of the incident surfaces and the exit surfaces of the first imaging optical elements 60*a* and 60*b* and the second imaging optical elements 80*a* to 80*d* is expressed by Expression (3) below.

$$S = \frac{\frac{Z^2}{r'}}{1 + \sqrt{1 - \left(\frac{Z}{r'}\right)^2}} + \sum_{i=0}^{16}\sum_{j=1}^{8} M_{ij} Y^i Z^j \tag{3}$$

In Expression (3), S represents a shape (sagittal shape) in a section that includes a normal line of a meridional line at a predetermined position in the main scanning direction and that is perpendicular to the main scanning cross section, and $M_{ij}$ represents an aspherical coefficient.

A curvature radius r' in the sub-scanning cross section (a sagittal curvature radius) at a position spaced apart from the optical axis by Y in the main scanning direction is expressed by Expression (4) below.

$$\frac{1}{r'} = \frac{1}{r} + \sum_{i=1}^{10} E_i Y^i \tag{4}$$

In Expression (4), “r” represents a sagittal curvature radius on the optical axis, and $E_i$ represents a sagittal variation coefficient.

In the light scanning apparatus 1 according to the present embodiment, the shape of the optical surface of each optical element is defined by the functions expressed in Expressions (1) to (4) above, but are not limited thereto and may be defined by other functions.

As illustrated in FIG. 1A and FIG. 1B, in the light scanning apparatus 1 according to the present embodiment, the first and second light fluxes LA and LB travel through the first imaging optical element 60*a* shared by the first and second light fluxes LA and LB, and the third and fourth light fluxes LC and LD travel through the first imaging optical element 60*b* shared by the third and fourth light fluxes LC and LD.

Specifically, the first and second light fluxes LA and LB travel through the upper portion 61*a* and the lower portion 62*a*, respectively, of the first imaging optical element 60*a* in the sub-scanning direction.

The third and fourth light fluxes LC and LD travel through the upper portion and the lower portion, respectively, of the first imaging optical element 60*b* in the sub-scanning direction.

The upper portion and the lower portion in the sub-scanning direction here may also be referred to as "opposite scanned surface-side portion," which is on a side opposite to the scanned surface in the sub-scanning direction, and "scanned surface-side portion," respectively.

As shown in Table 3-1 and Table 3-2, the shape of the exit surface of the first imaging optical element 60*a* is defined so as to differ between the upper portion 61*a* through which the first light flux LA travels and the lower portion 62*a* through which the second light flux LB travels.

That is, despite being a single optical element, the first imaging optical element 60*a* is shaped to have a multi-stage configuration in which the shape of the exit surface differs between the upper portion 61*a* and the lower portion 62*a* in the sub-scanning direction, and the first imaging optical element 60*b* has a similar configuration as well.

Figure 2:
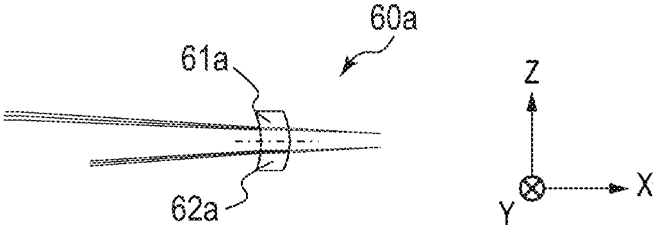
FIG. 2 is a sub-scanning cross sectional view of a first imaging optical element included in the light scanning apparatus according to the first embodiment.

FIG. 2 shows a sub-scanning cross sectional view of the first imaging optical element 60*a* provided in the light scanning apparatus 1 according to the present embodiment.

As illustrated in FIG. 2, the first imaging optical element 60*a* has, on respective sides of a center line indicated by the broken line in the sub-scanning direction, the upper portion 61*a* through which the first light flux LA travels and the lower portion 62*a* through which the second light flux LB travels.

The upper portion 61*a* and the lower portion 62*a* of the first imaging optical element 60*a* respectively have exit surfaces formed to have shapes as shown in Table 3-1 and Table 3-2.

This enables the first imaging optical element 60*a* to efficiently condense both of the first and second light fluxes LA and LB emitted from the first and second light sources 10*a* and 10*b*, respectively.

Figure 3:
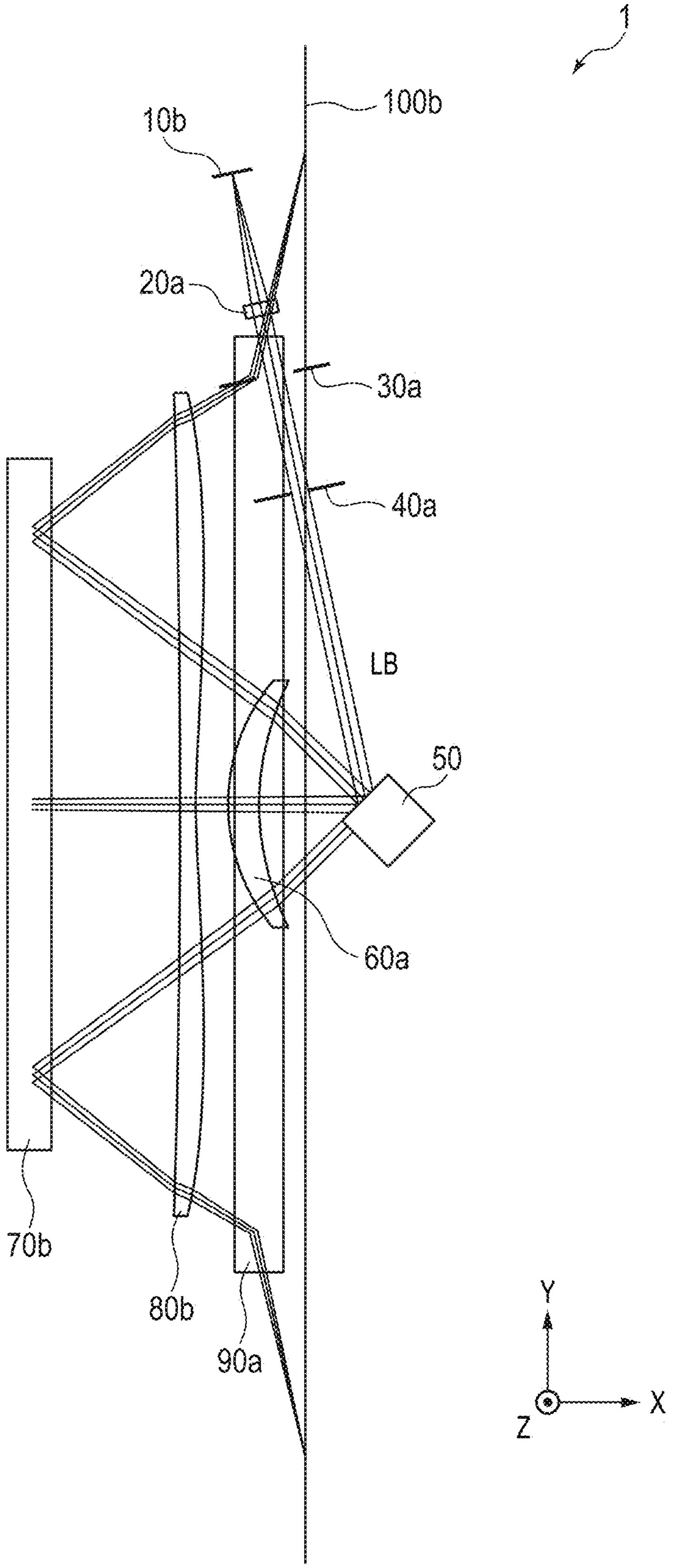
FIG. 3 is a partial projected view in a main scanning cross section of the light scanning apparatus according to the first embodiment.

FIG. 3 shows a partial projected view in the main scanning cross section of the light scanning apparatus 1 according to the present embodiment.

Specifically, the second incident optical system, the second imaging optical system, the first reflecting element 70*b*, and the second reflecting element 90*a* which form an optical path of the second light flux LB are illustrated in FIG. 3.

In the light scanning apparatus 1 according to the present embodiment, the use of the plurality of reflecting elements causes optical paths of the first to fourth light fluxes LA to LD to fold in the sub-scanning direction, and downsizing of the housing 2 and shortening of a distance (drum pitch) between adjacent scanned surfaces can thus be accomplished.

As a result, when being projected in the main scanning cross section as illustrated in FIG. 3, the first incident optical element 20*a* and an end portion of the second reflecting element 90*a* in a longitudinal direction are arranged in very close proximity to each other.

In other words, the first incident optical element 20*a* and the second reflecting element 90*a* are placed in a first region and a second region, respectively, in the X-direction, and at least a part of the first region and at least a part of the second region overlap with each other.

To paraphrase further, when being projected in the main scanning cross section, the first incident optical element 20*a* is placed on an extended line in a direction in which the second reflecting element 90*a* extends (the Y-direction).

Arrangement in which a plurality of optical elements are in too close proximity to one another like this is not preferred in view of outer shapes of the respective optical elements and space in which holding portions for holding the respective optical elements are to be formed.

On the other hand, the first incident optical element 20*a* in the light scanning apparatus 1 according to the present embodiment is placed in a manner that is advantageous from the viewpoint of overall optical performance of the apparatus, error sensitivity, and the like, and optical arrangement illustrated in FIG. 3 is accordingly optically preferred.

Next, a specific shape of the first and second incident optical elements 20*a* and 20*b* provided in the light scanning apparatus 1 according to the present embodiment is described.

Figure 4B:
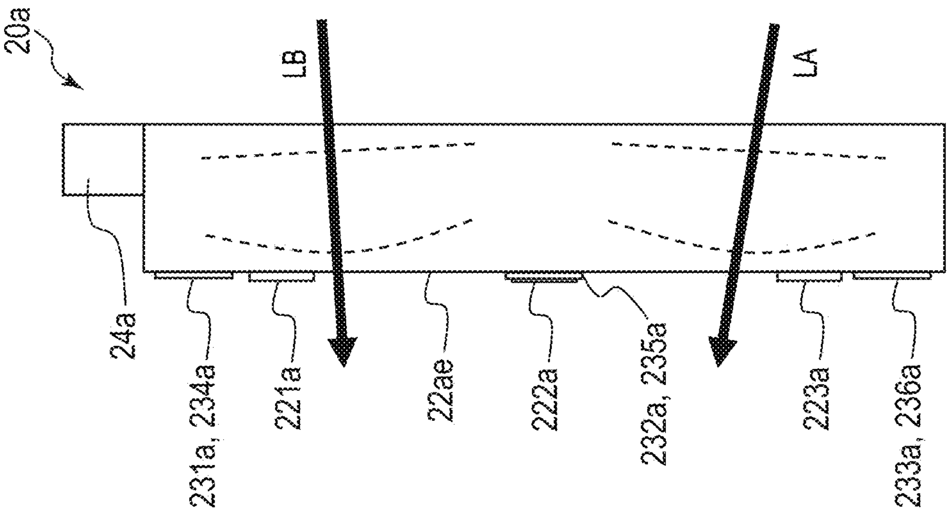
FIG. 4B is a side-elevational view of the first incident optical element included in the light scanning apparatus according to the first embodiment.
Figure 4A:
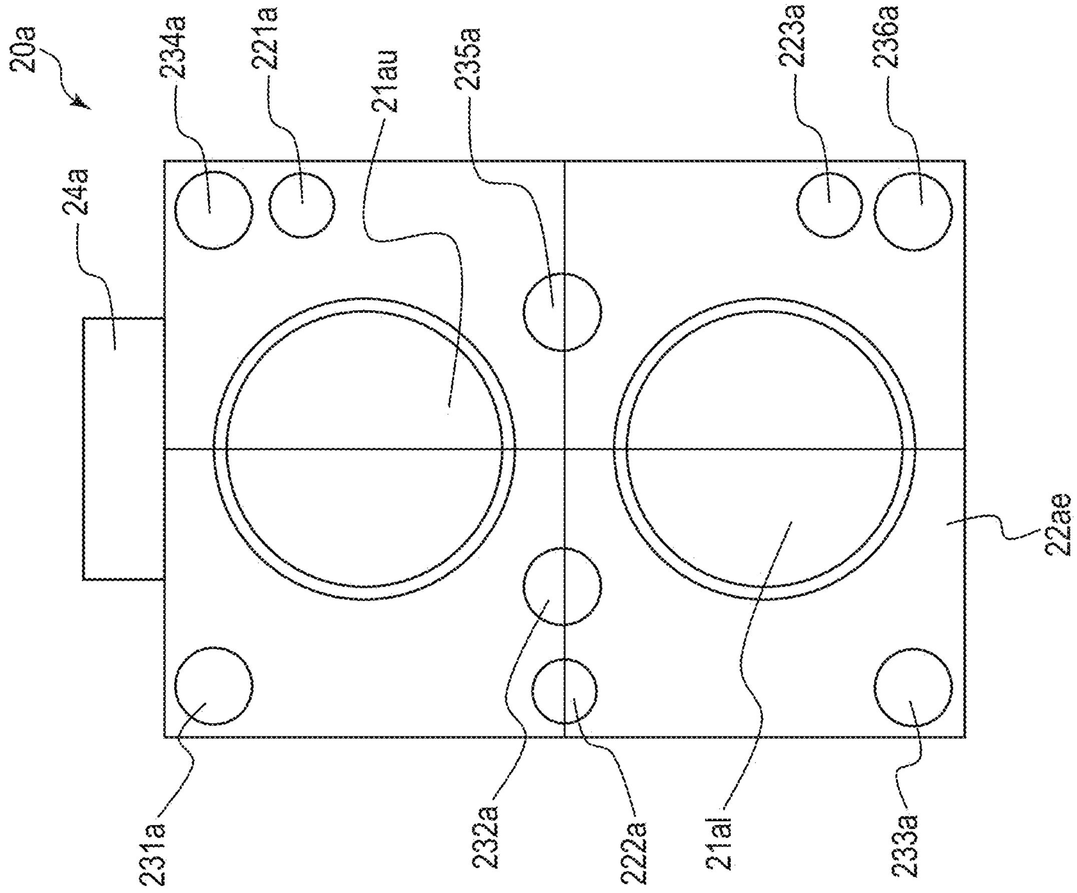
FIG. 4A is a frontal view of a first incident optical element included in the light scanning apparatus according to the first embodiment.

FIG. 4A and FIG. 4B show a frontal view and a side-elevational view, respectively, of the first incident optical element 20*a* provided in the light scanning apparatus 1 according to the present embodiment.

The two arrows illustrated in FIG. 4B indicate traveling directions of the first and second light fluxes LA and LB, respectively, and the broken lines illustrated in FIG. 4B schematically indicate shapes of respective optical surfaces in the sub-scanning cross section.

The first and the second incident optical elements 20*a* and 20*b* have shapes identical to each other, and, accordingly, the shape of the first incident optical element 20*a* alone is described below.

As illustrated in FIG. 4A and FIG. 4B, the first incident optical element 20*a* provided in the light scanning apparatus 1 according to the present embodiment is a so-called two-lens element formed from the upper portion 21*au* and the lower portion 21*al* which are placed at positions different from each other in the sub-scanning direction.

That is, in the first incident optical element 20*a*, the upper portion 21*au* and the lower portion 21*al* are integrally formed with each other.

The lower portion 21*al* and the upper portion 21*au* can condense the first and second light fluxes LA and LB, respectively, which have been emitted from the first and second light sources 10*a* and 10*b*, respectively.

The first incident optical element 20*a* is also provided with a plurality of reference surfaces 221*a*, 222*a*, and 223*a* (a second protruding portion group) for positioning in an optical axis direction of the first incident optical element 20*a*.

Specifically, the plurality of reference surfaces 221*a* to 223*a* are formed as protruding portions protruding outward from an outer shape surface 22*ae* on an exit surface side of a non-effective region which is around the upper portion 21*au* and the lower portion 21*al* and through which the first and second light fluxes LA and LB do not travel.

As described later, the plurality of reference surfaces 221*a* to 223*a* abut against a holding portion (projecting portion)

2*p* provided in the housing 2, to thereby determine a position of the first incident optical element 20*a* in the optical axis direction.

As described above, the first incident optical element 20*a* is formed by injection molding of a plastic material injected from a gate portion 24*a*.

For that reason, as illustrated in FIG. 4A, the first incident optical element 20*a* is provided with a plurality of pressed surfaces 231*a*, 232*a*, 233*a*, 234*a*, 235*a*, and 236*a* pressed by ejector pins when the first incident optical element 20*a* is released from a mold.

Specifically, the plurality of pressed surfaces 231*a* to 236*a* (a third protruding portion group) are formed as protruding portions protruding outward from the outer shape surface 22*ae*, similarly to the plurality of reference surfaces 221*a* to 223*a*.

A protrusion amount of each of the plurality of pressed surfaces 231*a* to 236*a*, on the other hand, is smaller than a protrusion amount of each of the plurality of reference surfaces 221*a* to 223*a*.

That is, the plurality of pressed surfaces 231*a* to 236*a* do not contribute to the positioning of the first incident optical element 20*a* in the optical axis direction.

In the first incident optical element 20*a*, some of the plurality of pressed surfaces 231*a* to 236*a*, specifically, a plurality of pressed surfaces 231*a*, 233*a*, 234*a*, and 236*a*, are formed so as to be closer to the outside in the sub-scanning direction than the plurality of reference surfaces 221*a* to 223*a* are.

With the plurality of pressed surfaces 231*a*, 233*a*, 234*a*, and 236*a* formed so as to be closer to the outside in the sub-scanning direction than the plurality of reference surfaces 221*a* to 223*a* are, a change in shape that leads to a molding defect when the first incident optical element 20*a* is released can be suppressed.

Next, holding of the first incident optical element 20*a* and the second reflecting element 90*a* in the light scanning apparatus 1 according to the present embodiment is described.

Figure 5A:
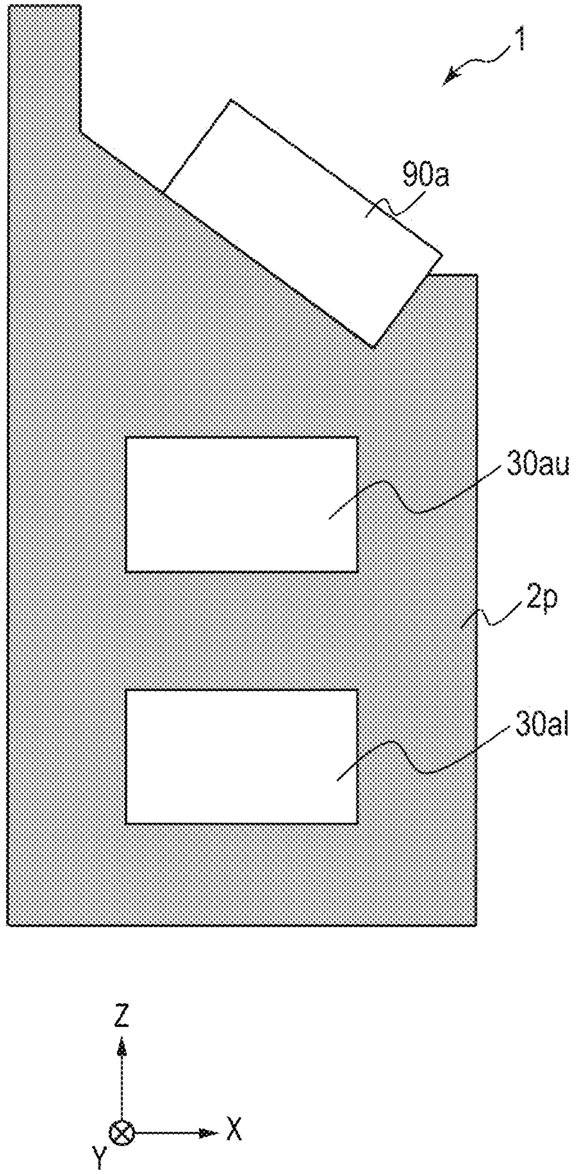
FIG. 5A is a view of the light scanning apparatus according to the first embodiment as viewed from an optical axis direction in the vicinity of the first incident optical element.
Figure 5B:
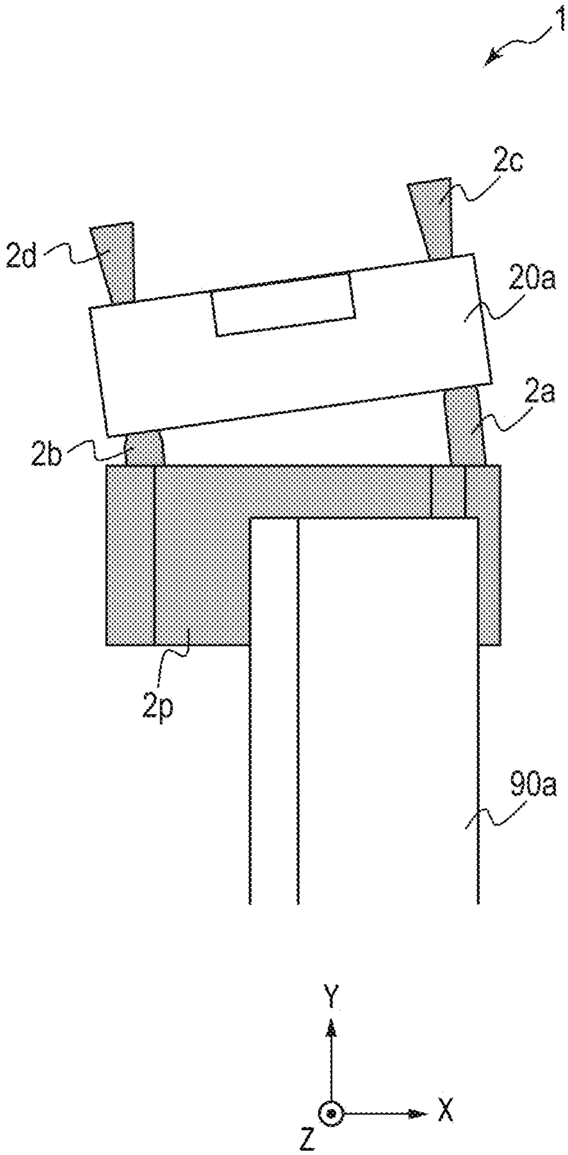
FIG. 5B is a view of the light scanning apparatus according to the first embodiment as viewed from a main scanning direction in the vicinity of the first incident optical element.
Figure 5C:
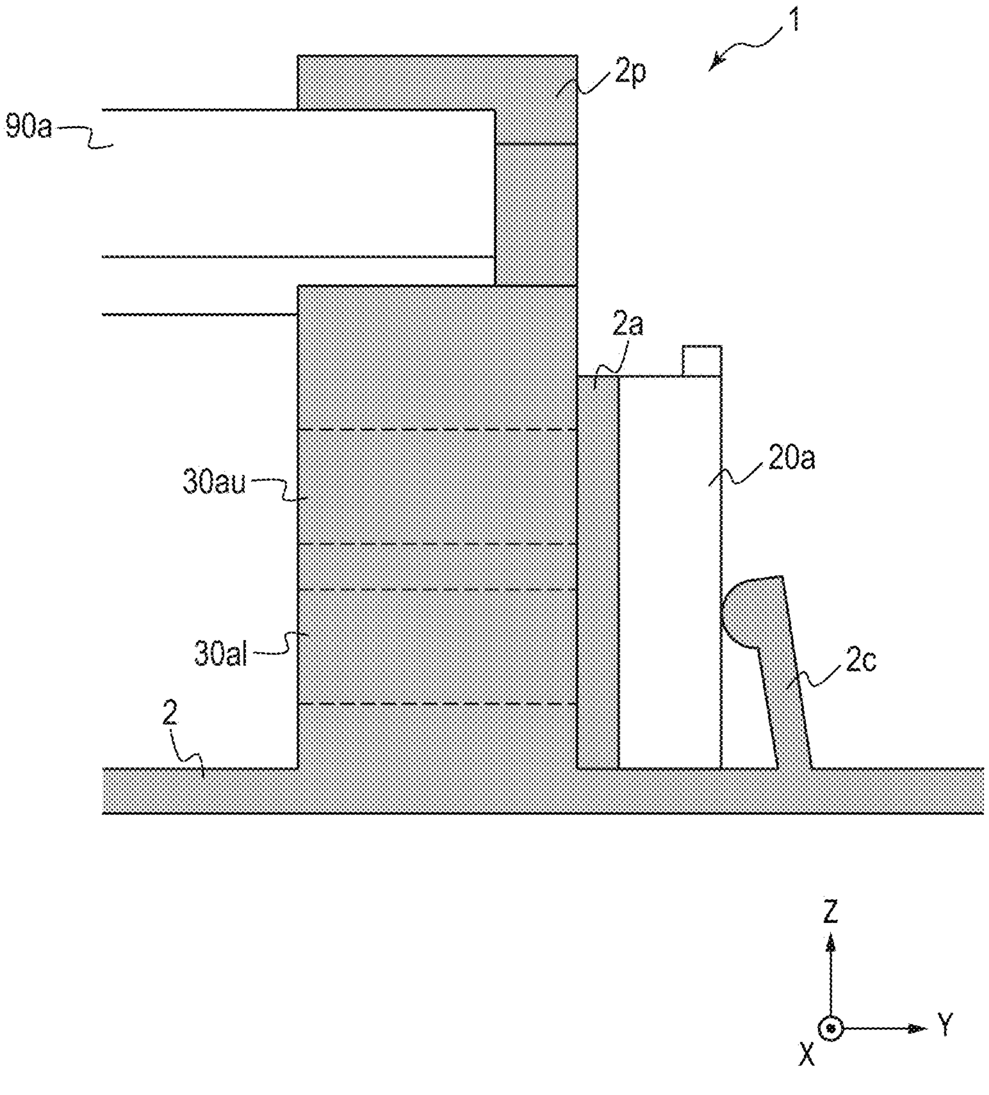
FIG. 5C is a view of the light scanning apparatus according to the first embodiment as viewed from a sub-scanning direction in the vicinity of the first incident optical element.

FIG. 5A, FIG. 5B, and FIG. 5C show a view of the vicinity of the first incident optical element 20*a* (an optical element) of the light scanning apparatus 1 according to the present embodiment as viewed from the optical axis direction, a view of the vicinity viewed from the main scanning direction, and a view of the vicinity viewed from the sub-scanning direction, respectively.

In the light scanning apparatus 1 according to the present embodiment, as illustrated in FIG. 5A, FIG. 5B, and FIG. 5C, the projecting portion 2*p* which projects in the sub-scanning direction and which is unitary with the first sub-scanning stop 30*a* is integrally formed in the housing 2.

In other words, the housing 2 includes a box portion having an internal space in which the optical elements are placed and a lid portion covering the internal space, and the projecting portion 2*p* projects in the sub-scanning direction from a predetermined position on a bottom surface of the box portion.

To paraphrase further, the projecting portion 2*p* is formed from the same material as a material of the rest of the housing 2.

The direction in which the projecting portion 2*p* projects is not limited to the sub-scanning direction, and the projecting portion 2*p* may project in a direction that is not parallel to the sub-scanning direction, such as a direction including a component of the sub-scanning direction.

The plurality of reference surfaces 221*a* to 223*a* formed on the outer shape surface 22*ae* on the exit surface side of the first incident optical element 20*a* abut against the projecting portion 2*p* in the main scanning direction (Y-direction).

Specifically, on a surface (first surface) of the projecting portion 2*p* that is perpendicular to an optical axis of the first incident optical system, two protruding portions 2*a* and 2*b* extending in the sub-scanning direction are formed on two sides of the optical axis direction (X-direction) of the first to fourth imaging optical systems with respect to the upper aperture portion 30*au* and the lower aperture portion 30*al* of the first sub-scanning stop 30*a*.

The plurality of reference surfaces 221*a* to 223*a* abut against the two protruding portions 2*a* and 2*b* (a first protruding portion group).

In the light scanning apparatus 1 according to the present embodiment, as illustrated in FIG. 5C, the two protruding portions 2*a* and 2*b* have lengths different from each other in the main scanning cross section.

As illustrated in FIG. 5A and FIG. 5B, biasing portions 2*c* and 2*d* integrally formed with the housing 2 bias the first incident optical element 20*a* toward the protruding portions 2*a* and 2*b* of the projecting portion 2*p*.

As described above, with the first incident optical element 20*a* biased in the optical axis direction toward the protruding portions 2*a* and 2*b* of the projecting portion 2*p* by the biasing portions 2*c* and 2*d*, the position of the first incident optical element 20*a* in the optical axis direction is determined.

That is, in the light scanning apparatus 1 according to the present embodiment, the first incident optical element 20*a* is held by the projecting portion 2*p* and the biasing portions 2*c* and 2*d*.

As illustrated in FIG. 5A to FIG. 5C, the second reflecting element 90*a* (reflecting optical element) abuts against the projecting portion 2*p* as well in the sub-scanning direction (Z-direction).

Specifically, the second reflecting element 90*a* is placed on a concave portion formed on a surface (second surface) of the projecting portion 2*p* that is parallel to the optical axis of the first incident optical system, and is biased toward the concave portion by a biasing member (not shown).

That is, in the light scanning apparatus 1 according to the present embodiment, the second reflecting element 90*a* is held by the projecting portion 2*p* and the biasing member.

The projecting portion 2*p* may be formed so that the second reflecting element 90*a* abuts against the projecting portion 2*p* in the main scanning direction (Y-direction) as required.

In the light scanning apparatus 1 according to the present embodiment, by employing the configuration described above, the first incident optical element 20*a* can be held despite the closeness of the first incident optical element 20*a* and the second reflecting element 90*a* to each other in the main scanning cross section.

That is, in the light scanning apparatus 1 according to the present embodiment, the first incident optical element 20*a* can be supported so as to be fixed without providing a separate support member for supporting the first incident optical element 20*a*.

In the light scanning apparatus 1 according to the present embodiment, as illustrated in FIG. 5A to FIG. 5C, both of the first incident optical element 20*a* and the second reflecting element 90*a* can be held with use of the shared projecting portion 2*p*.

Accordingly, compared to a case in which a holding portion for holding the first incident optical element 20*a* and a holding portion for holding the second reflecting element 90*a* are formed spaced apart from each other, a shape of the housing 2 can be simplified.

In addition, in the light scanning apparatus 1 according to the present embodiment, as illustrated in FIG. 5A and FIG. 5C, the holding portion for holding the first incident optical element 20*a*, the holding portion for holding the second reflecting element 90*a*, and the first sub-scanning stop 30*a* are integrally formed as the projecting portion 2*p*.

Accordingly, in the light scanning apparatus 1 according to the present embodiment, the shape of the housing 2 can be simplified.

Figure 6A:
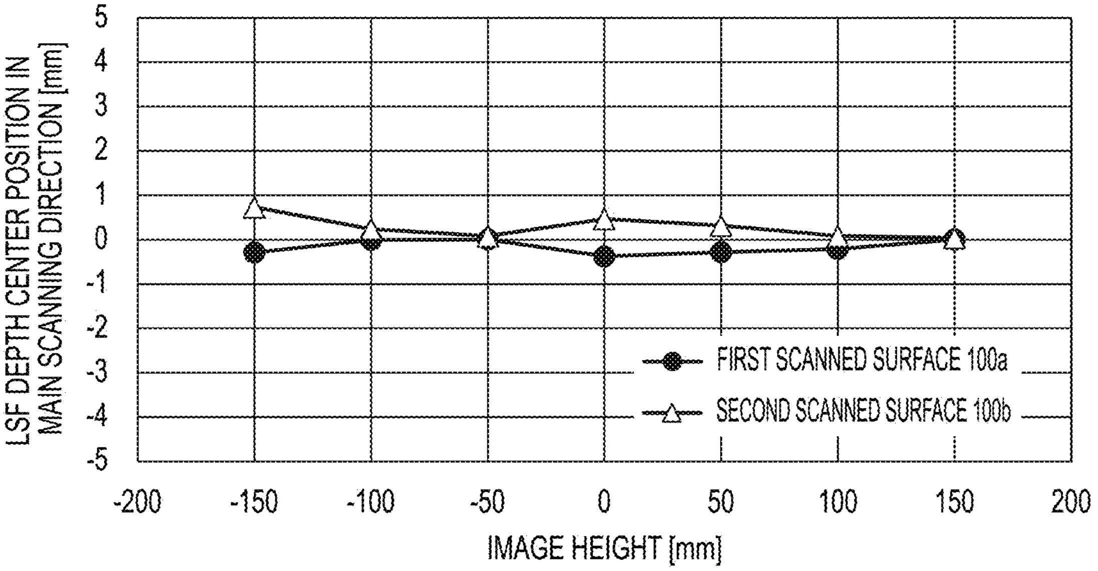
FIG. 6A is a graph for showing image height dependence of an LSF depth center position in the main scanning direction on each scanned surface in the light scanning apparatus according to the first embodiment.
Figure 6B:
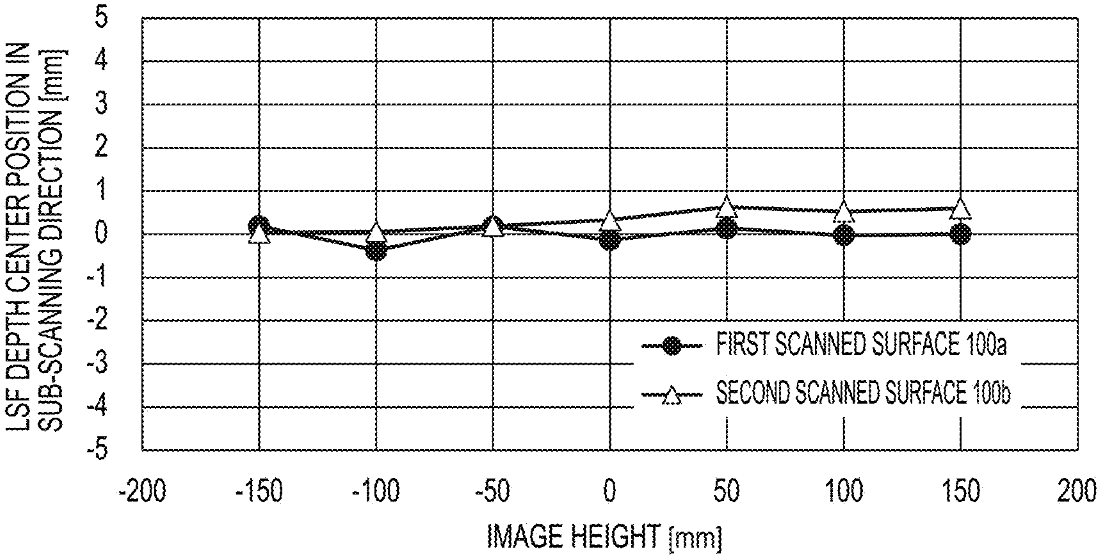
FIG. 6B is a graph for showing image height dependence of an LSF depth center position in the sub-scanning direction on each scanned surface in the light scanning apparatus according to the first embodiment.

FIG. 6A and FIG. 6B show image height dependence of a line-spread function (LSF) depth center position in the main scanning direction and an LSF depth center position in the sub-scanning direction, respectively, on each scanned surface in the light scanning apparatus 1 according to the present embodiment.

The LSF depth center position in the main scanning direction and the LSF depth center position in the sub-scanning direction here refer to center positions of regions in which LSF widths in the main scanning direction and the sub-scanning direction, respectively, are equal to or less than a slice level, when defocusing in the optical axis direction in the vicinity of a predetermined scanned surface.

In the light scanning apparatus 1 according to the present embodiment, in both of the main scanning direction and the sub-scanning direction, the slice level is set to 120 μm for entire image heights.

The LSF width in the main scanning direction and the LSF width in the sub-scanning direction refer to widths of slices of light amount profiles obtained by integrating spot profiles at each image height in the sub-scanning direction and the main scanning direction, respectively, when the light amount profiles are sliced at a position that is 13.5% of a maximum value.

As shown in FIG. 6A and FIG. 6B, the LSF depth center position in the main scanning direction and the LSF depth center position in the sub-scanning direction both fall within ±1 mm for all image heights, and this shows that excellent imaging performance is achieved in the light scanning apparatus 1 according to the present embodiment.

Figure 7:
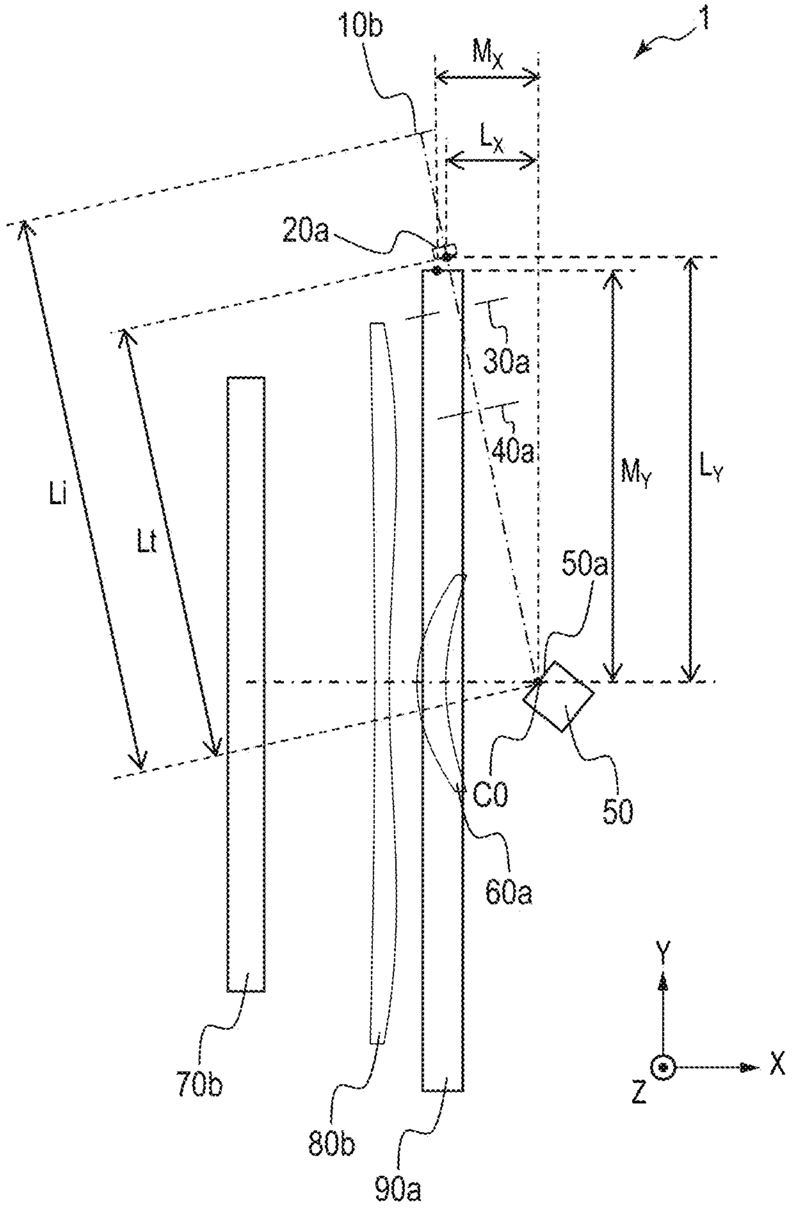
FIG. 7 is a partial projected view in the main scanning cross section of the light scanning apparatus according to the first embodiment.

FIG. 7 shows a partial projected view in the main scanning cross section for illustrating inequalities in the light scanning apparatus 1 according to the present embodiment.

First, a distance in the X-direction between the on-axis deflection point C0 on the first deflecting surface 50*a* of the deflecting unit 50 and a center of the outer shape surface 22*ae* of the first incident optical element 20*a* on which the plurality of reference surfaces 221*a* to 223*a* are formed is represented by $L_X$.

The on-axis deflection point C0 here refers to a deflection point on the first deflecting surface 50*a* of principal rays of the first and second light fluxes LA and LB deflected by the deflecting unit 50 so that on-axis image heights on the first and second scanned surfaces 100*a* and 100*b* are scanned with the first and second light fluxes LA and LB.

A distance in the X-direction between the on-axis deflection point C0 and a center of the reflecting surface of the second reflecting element 90*a* is represented by $M_X$.

In this case, it is preferred that the following Inequality (5) is satisfied in the light scanning apparatus 1 according to the present embodiment.

$$0.500 < M_X/L_X < 1.500 \tag{5}$$

When the ratio exceeds the upper limit value in Inequality (5), the second reflecting element 90*a* is separated too far from the deflecting unit 50 in the main scanning cross section, which makes it difficult to shorten an interval between adjacent scanned surfaces, that is, to downsize the light scanning apparatus 1 according to the present embodiment, so that it is unpreferable.

When the ratio falls below the lower limit value in Inequality (5), on the other hand, the second reflecting element 90*a* is too close to the deflecting unit 50 in the main scanning cross section. Accordingly, the second reflecting element 90*a* may interfere with at least one optical element provided in the third and fourth imaging optical systems on the opposite side with respect to the deflecting unit 50.

Then, when the second reflecting element 90*a* and the at least one optical element are separated from each other in the sub-scanning direction in order to suppress such interference, the light scanning apparatus 1 according to the present embodiment increases in size in the sub-scanning direction, so that it is unpreferable.

In the light scanning apparatus 1 according to the present embodiment, it is more preferred that the following Inequality (5a) be satisfied.

$$0.700 < M_X/L_X < 1.400 \tag{5a}$$

A distance in the Y-direction between the on-axis deflection point C0 and the center of the outer shape surface 22*ae* of the first incident optical element 20*a* on which the plurality of reference surfaces 221*a* to 223*a* are formed is represented by $L_Y$.

A distance in the Y-direction between the on-axis deflection point C0 and the end portion of the second reflecting element 90*a* that is closest to the first incident optical element 20*a* is represented by $M_Y$.

In this case, it is preferred that the following Inequality (6) is satisfied in the light scanning apparatus 1 according to the present embodiment.

$$0.9000 < M_Y/L_Y < 0.9700 \tag{6}$$

When the ratio exceeds the upper limit value in Inequality (6), too close proximity of the first incident optical element 20*a* and the second reflecting element 90*a* to each other may cause interference therebetween, so that it is unpreferable.

When the ratio falls below the lower limit value in Inequality (6), on the other hand, the first incident optical element 20*a* and the second reflecting element 90*a* are separated too far from each other. This causes an increase in size of the light scanning apparatus 1 according to the present embodiment, so that it is unpreferable.

In addition, when the ratio falls below the lower limit value in Inequality (6), it is required to provide the holding portion for holding the first incident optical element 20*a* and the holding portion for holding the second reflecting element 90*a* so as to be separated from each other, instead of the single projecting portion 2*p*. This complicates the structure of the housing 2, so that it is unpreferable.

In the light scanning apparatus 1 according to the present embodiment, it is more preferred that the following Inequality (6a) is satisfied.

$$0.9300 < M_Y/L_Y < 0.9700 \quad (6a)$$

A distance in the main scanning cross section (the XY section) between the on-axis deflection point C0 and the center of the outer shape surface 22*ae* of the first incident optical element 20*a* on which the plurality of reference surfaces 221*a* to 223*a* are formed is represented by $L_t$.

A distance between the first and second light sources 10*a* and 10*b*, and the on-axis deflection point C0 in the optical axis direction of the first and second incident optical systems (the optical axis direction of the first incident optical element 20*a*) is represented by $L_i$.

In this case, it is preferred that the following Inequality (7) is satisfied in the light scanning apparatus 1 according to the present embodiment.

$$0.70 < L_t/L_i < 0.90 \quad (7)$$

When the ratio exceeds the upper limit value in Inequality (7), the first incident optical element 20*a* and the second reflecting element 90*a* are separated too far from each other. Accordingly, it is required to provide the holding portion for holding the first incident optical element 20*a* and the holding portion for holding the second reflecting element 90*a* so as to be separated from each other, instead of the single projecting portion 2*p*. This complicates the structure of the housing 2, so that it is unpreferable.

When the ratio falls below the lower limit value in Inequality (7), on the other hand, optical efficiency in the light scanning apparatus 1 according to the present embodiment drops, specifically, light amounts of the first and second light fluxes LA and LB that reach the first and second scanned surfaces 100*a* and 100*b*, respectively, decrease, so that it is unpreferable.

In the light scanning apparatus 1 according to the present embodiment, it is more preferred that the following Inequality (7a) is satisfied.

$$0.75 < L_t/L_i < 0.85 \quad (7a)$$

In the light scanning apparatus 1 according to the present embodiment, as shown in Table 1 and Table 10, which is described later, Inequalities (5), (5a), (6), (6a), (7), and (7a) are satisfied.

As described above, in the light scanning apparatus 1 according to the present embodiment, the first incident optical element 20*a* and the second reflecting element 90*a* are held by the projecting portion 2*p* integrally formed with the housing 2.

Both of the first incident optical element 20*a* and the second reflecting element 90*a* can thus be held with a simple configuration when downsizing is to be achieved by placing the first incident optical element 20*a* and the second reflecting element 90*a* close to each other.

That is, in the light scanning apparatus 1 according to the present embodiment, the number of components can be reduced by holding the first incident optical element 20*a* and the second reflecting element 90*a* by the projecting portion 2*p*, which is integrally formed with the housing 2, instead of using separate holding members.

Second Embodiment

Figure 8A:
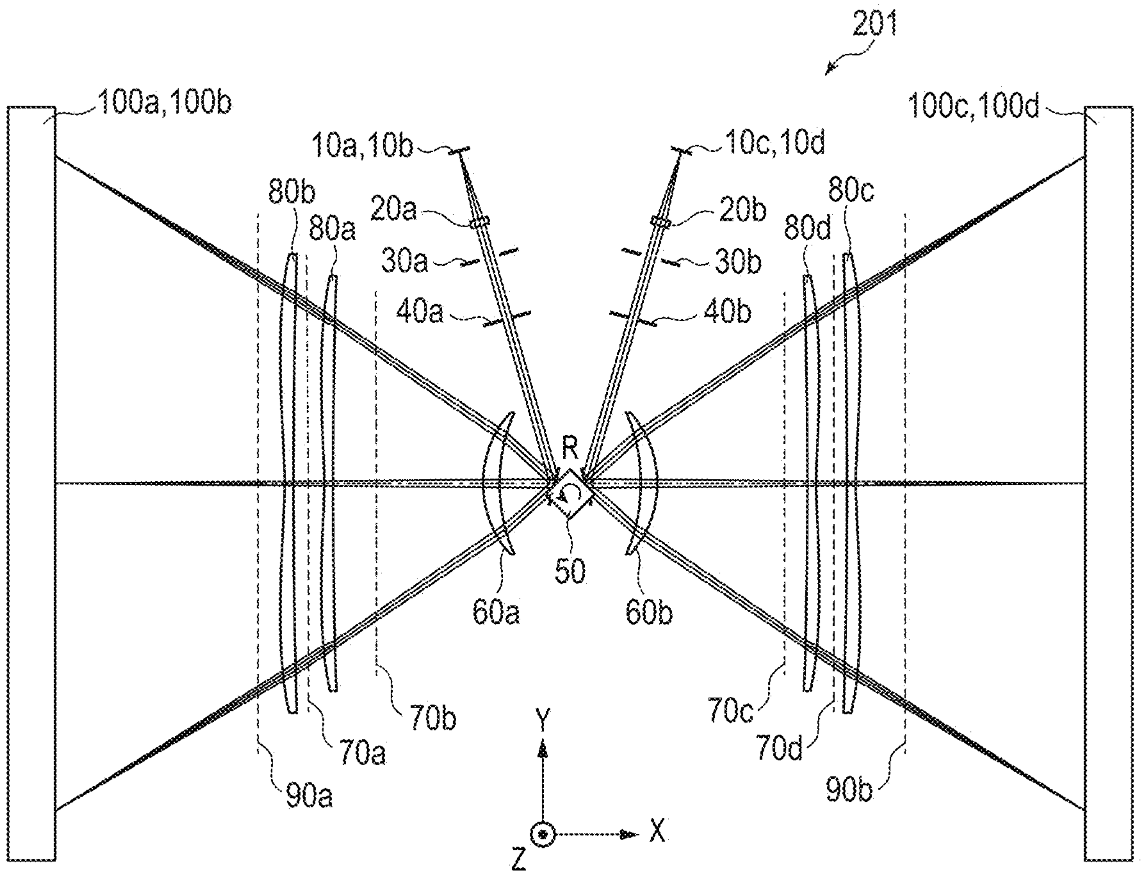
FIG. 8A is a developed view in the main scanning cross section of a light scanning apparatus according to a second embodiment of the present invention.
Figure 8B:
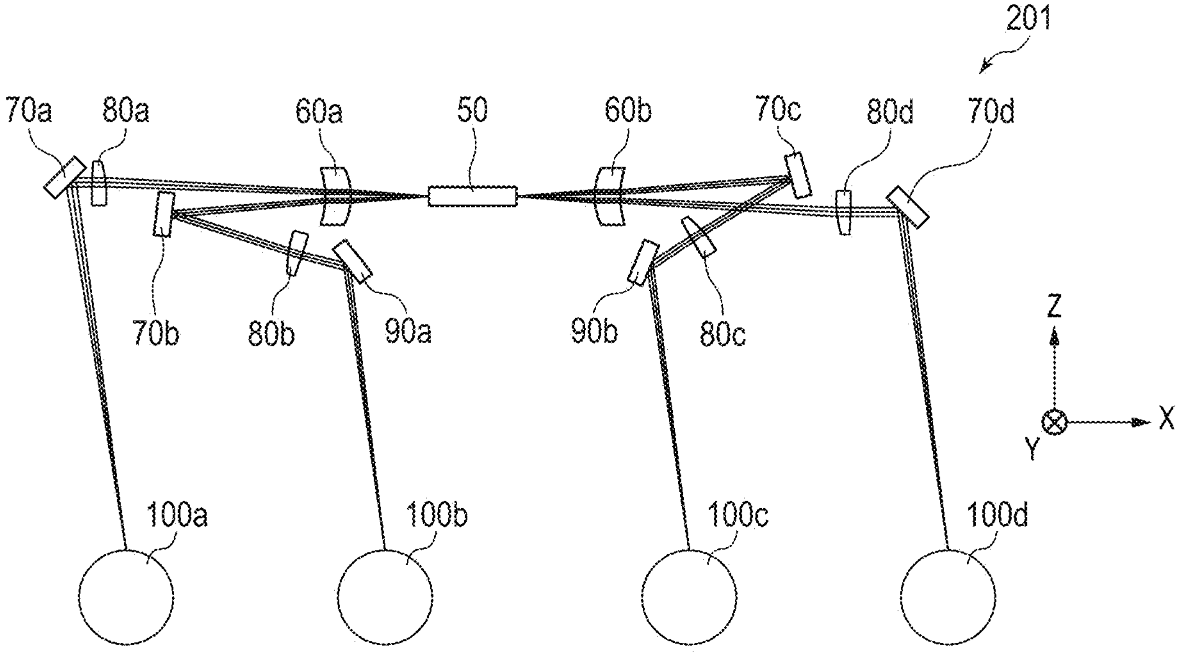
FIG. 8B is a partial sub-scanning cross sectional view of the light scanning apparatus according to the second embodiment.

FIG. 8A and FIG. 8B show a developed view (corresponding to FIG. 1A) in a main scanning cross section of a light scanning apparatus 201 according to a second embodiment of the present invention, and a partial sub-scanning cross sectional view (corresponding to FIG. 1B) thereof, respectively.

Figure 9:
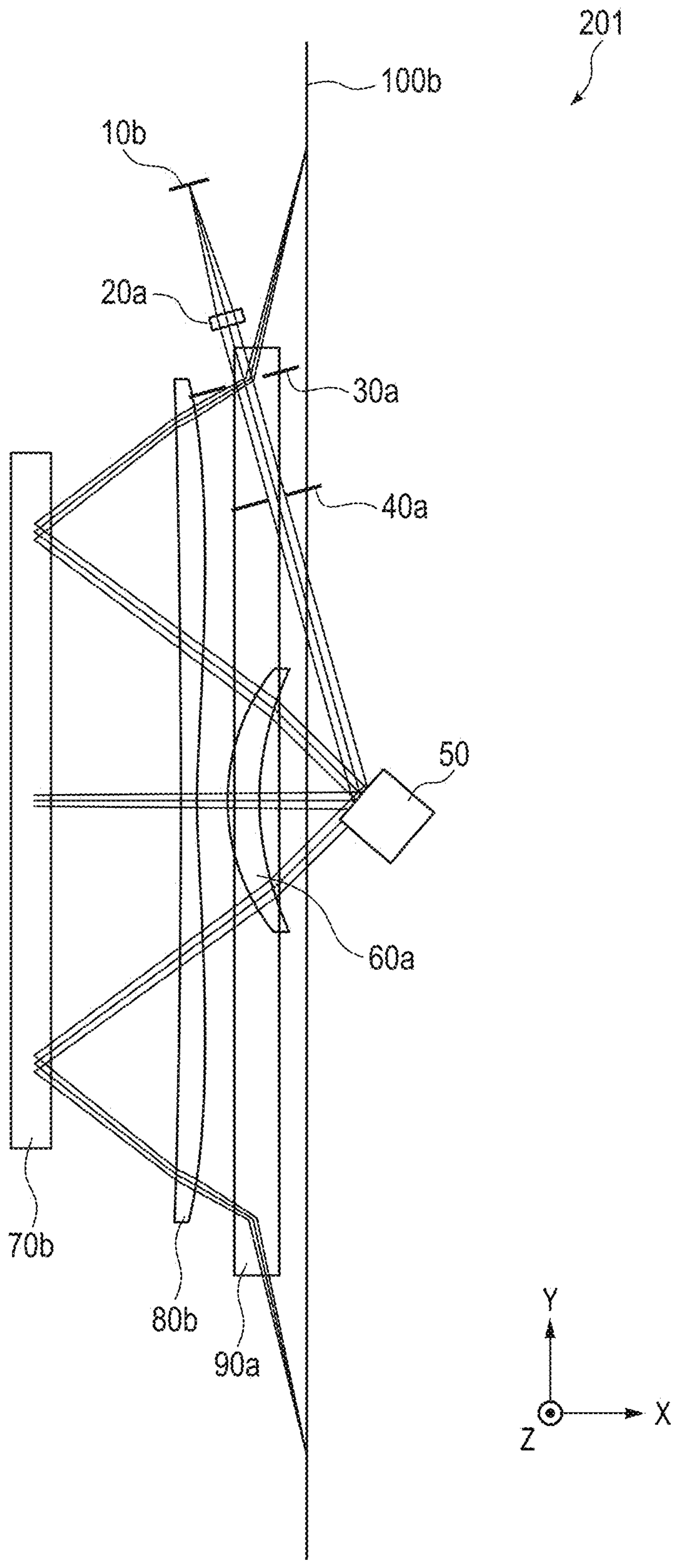
FIG. 9 is a partial projected view in the main scanning cross section of the light scanning apparatus according to the second embodiment.

FIG. 9 shows a partial projected view (corresponding to FIG. 3) in the main scanning cross section of the light scanning apparatus 201 according to the second embodiment.

The light scanning apparatus 201 according to the present embodiment has the same configuration as that of the light scanning apparatus 1 according to the first embodiment, except for differences in various numerical values. Accordingly, the same members are denoted by the same reference numbers, and descriptions thereof are omitted.

Specification values of the light scanning apparatus 201 according to the present embodiment, refractive indices and coordinates of the respective optical elements, and shapes of optical surfaces of the respective optical elements are shown in Table 4, Table 5, and Table 6-1 and Table 6-2, respectively.

In Table 5, Table 6-1, and Table 6-2, information about only the first and second incident optical systems and the first and second imaging optical systems is shown.

That is, in Table 5, Table 6-1, and Table 6-2, information about the third and fourth incident optical systems and the third and fourth imaging optical systems is omitted.

TABLE 4

| Item | Parameter · Unit | Value |
|---|---|---|
| Wavelength used by first to fourth light sources 10a to 10d | λ [nm] | 790 |
| Scanning width of first to fourth scanned surfaces 100a to 100d | h [mm] | 326 |
| Number of deflecting surfaces of deflecting unit 50 | [Surface] | 4 |
| Circumscribed circle diameter of deflecting unit 50 | Pd [mm] | 20 |
| Maximum scanning angle of deflecting unit 50 | θmax [rad] | 0.787 |
| Rotation center coordinates of deflecting unit 50 | (X, Y) [mm] | (6.10, −3.66) |
| Absolute value of incident angle of first to fourth incident optical systems in main scanning cross section | θim [deg] | 74.00 |
| Absolute value of incident angle of first to fourth incident optical systems in sub-scanning cross section | θis [deg] | 2.70 |
| Width of respective aperture portions of first and second sub-scanning stops 30a and 30b in sub-scanning direction | As [mm] | 2.84 |
| Width of respective aperture portions of first and second main scanning stops 40a and 40b in main scanning direction | Am [mm] | 3.75 |
| Distance in X-direction between on-axis deflection point C0 and centers of exit surfaces of first and second incident optical elements 20a and 20b | Lx [mm] | 34.45 |

TABLE 4-continued

| Item | Parameter · Unit | Value |
| --- | --- | --- |
| Distance in Y-direction between on-axis deflection point C0 and centers of exit surfaces of first and second incident optical elements 20a and 20b | Ly [mm] | 120.13 |
| Distance in XY cross section between on-axis deflection point C0 and centers of exit surfaces of first and second incident optical elements 20a and 20b | Lt [mm] | 125.11 |
| Distance in optical axis direction of first to fourth incident optical systems between first to fourth light sources 10a to 10d and on-axis deflection point C0 | Li [mm] | 161.70 |
| Distance in X-direction between on-axis deflection point C0 and centers of reflecting surfaces of second reflecting elements 90a and 90b | Mx [mm] | 27.55 |
| Distance in Y-direction between on-axis deflection point C0 and centers of reflecting surfaces of second reflecting elements 90a and 90b | My [mm] | 116.50 |

TABLE 5

| Surface number | | Surface interval [mm] | Refractive index (λ = 790 nm) | Coordinates of surface vertex tc(x) | tc(y) | tc(z) | Direction cosine of optical axis gx(x) | gx(y) | gx(z) |
| --- | --- | --- | --- | --- | --- | --- | --- | --- | --- |
| 1 | First light source 10a | 0.250 | 1.000 | −44.521 | 155.263 | −7.617 | −0.275 | 0.960 | −0.047 |
| 2 | Glass cover for laser chip | 33.340 | 1.511 | −44.452 | 155.023 | −7.605 | −0.275 | 0.960 | −0.047 |
| 3 | Incident surface of lower portion 21al of first incident optical element 20a | 3.000 | 1.528 | −35.273 | 123.011 | −6.035 | −0.275 | 0.960 | −0.047 |
| 4 | Exit surface of lower portion 21al of first incident optical element 20a | 15.150 | 1.000 | −34.447 | 120.130 | −5.893 | −0.275 | 0.960 | −0.047 |
| 5 | Lower aperture portion 30al of first sub-scanning stop 30a | 29.870 | 1.000 | −30.275 | 105.583 | −5.180 | −0.276 | 0.961 | 0.000 |
| 6 | Aperture portion of first main scanning stop 40a | 80.090 | 1.000 | −22.051 | 76.902 | −3.773 | −0.276 | 0.961 | 0.000 |
| 7 | First deflecting surface 50a of deflecting unit 50 (in on-axis image height scanning) | 26.000 | 1.000 | 0.451 | 0.598 | 0.000 | −0.799 | 0.602 | 0.000 |
| 8 | Incident surface of upper portion 61a of first imaging optical element 60a | 8.200 | 1.528 | −26.000 | 0.000 | 0.000 | −1.000 | 0.000 | 0.000 |
| 9 | Exit surface of upper portion 61a of first imaging optical element 60a | 69.300 | 1.000 | −34.200 | 0.000 | 0.000 | −1.000 | 0.000 | 0.000 |

TABLE 5-continued

| | | | | | | | | | |
|---|---|---|---|---|---|---|---|---|---|
| 11 | Incident surface of second imaging optical element 80a | 4.300 | 1.528 | −103.500 | 0.000 | 5.030 | −1.000 | 0.000 | 0.000 |
| 12 | Exit surface of second imaging optical element 80a | 10.670 | 1.000 | −107.800 | 0.000 | 5.030 | −1.000 | 0.000 | 0.000 |
| 13 | Reflecting surface of first reflecting element 70a | 114.530 | 1.000 | −114.192 | 5.000 | 4.980 | −0.759 | 0.000 | 0.652 |
| 14 | First scanned surface 100a | — | 1.000 | −97.695 | 0.000 | −112.686 | −0.151 | 0.000 | 0.989 |
| 1 | Second light source 10b | 0.250 | 1.000 | −44.521 | 155.263 | 7.617 | −0.275 | 0.960 | 0.047 |
| 2 | Glass cover for laser chip | 33.340 | 1.511 | −44.452 | 155.023 | 7.605 | −0.275 | 0.960 | 0.047 |
| 3 | Incident surface of upper portion 21au of first incident optical element 20a | 3.000 | 1.528 | −35.273 | 123.011 | 6.035 | −0.275 | 0.960 | 0.047 |
| 4 | Exit surface of lower portion 21au of first incident optical element 20a | 15.150 | 1.000 | −34.447 | 120.130 | 5.893 | −0.275 | 0.960 | 0.047 |
| 5 | Upper aperture portion 30au of first sub-scanning stop 30a | 29.870 | 1.000 | −30.275 | 105.583 | 5.180 | −0.276 | 0.961 | 0.000 |
| 6 | Aperture portion of first main scanning stop 40a | 80.090 | 1.000 | −22.051 | 76.902 | 3.773 | −0.276 | 0.961 | 0.000 |
| 7 | First deflecting surface 50a of deflecting unit 50 (in on-axis image height scanning) | 26.000 | 1.000 | 0.451 | 0.598 | 0.000 | −0.799 | 0.602 | 0.000 |
| 8 | Incident surface of lower portion 62a of first imaging optical element 60a | 8.200 | 1.528 | −26.000 | 0.000 | 0.000 | −1.000 | 0.000 | 0.000 |
| 9 | Exit surface of upper portion 62a of first imaging optical element 60a | 48.348 | 1.000 | −34.200 | 0.000 | 0.000 | −1.000 | 0.000 | 0.000 |
| 10 | Reflecting surface of first reflecting element 70b | 39.452 | 1.000 | −83.252 | 0.000 | −5.275 | −0.991 | 0.000 | 0.132 |
| 11 | Incident surface of second imaging optical element 80b | 4.300 | 1.528 | −46.366 | 0.000 | −17.300 | −0.965 | 0.000 | 0.262 |
| 12 | Exit surface of second imaging optical element 80b | 4.523 | 1.000 | −42.216 | 0.000 | −18.427 | −0.965 | 0.000 | 0.262 |

TABLE 5-continued

| | | | | | | | | | |
|---|---|---|---|---|---|---|---|---|---|
| 13 | Reflecting surface of second reflecting element 90a | 102.177 | 1.000 | −27.554 | −3.500 | −21.926 | −0.741 | 0.000 | −0.672 |
| 14 | Second scanned surface 100b | — | 1.000 | −14.695 | 0.000 | −112.686 | 0.167 | 0.000 | −0.986 |

TABLE 6-1

| | | Aspherical coefficient | | | | | |
|---|---|---|---|---|---|---|---|
| | | Lower portion 21al of first incident optical element 20a | | Upper portion 61a of first imaging optical element 60a | | Second imaging optical element 80a | |
| | Coefficient | Incident surface | Exit surface | Incident surface | Exit surface | Incident surface | Exit surface |
| Meridional line | R | — | −3.717E+01 | −7.066E+01 | −4.280E+01 | −4.000E+03 | 3.472E+02 |
| | K | — | — | 8.400E−01 | −5.308E−01 | — | −8.636E+01 |
| | B3 | — | — | — | — | — | — |
| | B4 | — | — | −8.279E−07 | −3.075E−07 | — | −2.029E−07 |
| | B5 | — | — | — | — | — | — |
| | B6 | — | — | 6.693E−09 | 1.674E−09 | — | 1.634E−11 |
| | B7 | — | — | — | — | — | — |
| | B8 | — | — | −5.668E−12 | 1.147E−12 | — | −9.586E−16 |
| | B9 | — | — | — | — | — | — |
| | B10 | — | — | 1.627E−15 | −1.200E−15 | — | 2.624E−20 |
| Sagittal line | r | — | −2.617E+01 | 2.000E+01 | 1.866E+01 | 3.600E+01 | −1.458E+02 |
| | E1 | — | — | — | — | — | 3.414E−07 |
| | E2 | — | — | — | 2.074E−05 | −8.693E−07 | 1.764E−06 |
| | E3 | — | — | — | — | — | −3.306E−09 |
| | E4 | — | — | — | 7.575E−09 | — | −3.165E−10 |
| | E5 | — | — | — | | — | 1.363E−12 |
| | E6 | — | — | — | −2.732E−11 | — | 3.231E−14 |
| | E7 | — | — | — | | — | −2.056E−16 |
| | E8 | — | — | — | −1.377E−14 | — | −2.120E−18 |
| | E9 | — | — | — | — | — | 1.015E−20 |
| | E10 | — | — | — | 3.289E−17 | — | 6.916E−23 |
| Additional item | M0_1 | — | — | — | −3.160E−03 | −1.020E−01 | 2.178E−02 |
| | M1_1 | — | — | — | — | −1.693E−04 | −1.586E−04 |
| | M2_1 | — | — | — | 5.002E−05 | −1.359E−05 | −2.437E−05 |
| | M3_1 | — | — | — | — | 1.172E−07 | 1.054E−07 |
| | M4_1 | — | — | — | — | 1.554E−09 | 3.596E−09 |
| | M5_1 | — | — | — | — | −1.620E−11 | −1.352E−11 |
| | M6_1 | — | — | — | — | 2.900E−13 | −3.411E−13 |
| | M7_1 | — | — | — | — | 1.196E−15 | 9.645E−16 |
| | M8_1 | — | — | — | — | −1.790E−17 | 6.531E−17 |
| | M9_1 | — | — | — | — | −1.503E−20 | −4.354E−21 |
| | M10_1 | — | — | — | — | −8.145E−22 | −4.321E−21 |
| | C3 | −8.669E−03 | — | — | — | — | — |
| | C5 | −7.847E−03 | — | — | — | — | — |

TABLE 6-2

| | | Aspherical coefficient | | | | | |
|---|---|---|---|---|---|---|---|
| | | Upper portion 21au of first incident optical element 20a | | Lower portion 62a of first imaging optical element 60a | | Second imaging optical element 80b | |
| | Coefficient | Incident surface | Exit surface | Incident surface | Exit surface | Incident surface | Exit surface |
| Meridional line | R | — | −3.717E+01 | −7.066E+01 | −4.369E+01 | 4.000E+03 | −3.768E+02 |
| | K | — | — | 8.400E−01 | −9.590E−01 | — | −7.588E+01 |
| | B3 | — | — | — | — | — | — |
| | B4 | — | — | −8.279E−07 | −1.310E−06 | — | 1.316E−07 |
| | B5 | — | — | — | — | — | — |
| | B6 | — | — | 6.693E−09 | 1.629E−09 | — | −6.963E−12 |
| | B7 | — | — | — | — | — | — |
| | B8 | — | — | −5.668E−12 | 9.682E−13 | — | 2.883E−16 |
| | B9 | — | — | — | — | — | — |
| | B10 | — | — | 1.627E−15 | −1.037E−15 | — | −5.597E−21 |
| Sagittal line | r | — | −2.617E+01 | 2.000E+01 | 3.451E+01 | −4.388E+01 | 1.074E+02 |
| | E1 | — | — | — | — | — | — |
| | E2 | — | — | — | 6.426E−07 | 8.351E−07 | −1.142E−06 |
| | E3 | — | — | — | | — | — |
| | E4 | — | — | — | 1.145E−07 | — | 3.240E−10 |
| | E5 | — | — | — | — | — | — |
| | E6 | — | — | — | −3.029E−10 | — | −4.668E−14 |
| | E7 | — | — | — | | — | — |
| | E8 | — | — | — | 3.690E−13 | — | 3.817E−18 |
| | E9 | — | — | — | | — | — |
| | E10 | — | — | — | −1.754E−16 | — | −1.197E−22 |
| Additional item | M0_1 | — | — | — | 6.400E−02 | −1.199E−01 | 5.958E−02 |
| | M1_1 | — | — | — | — | −3.345E−04 | −3.210E−04 |
| | M2_1 | — | — | — | −5.394E−05 | −1.051E−05 | −2.282E−05 |
| | M3_1 | — | — | — | — | 1.483E−07 | 1.373E−07 |
| | M4_1 | — | — | — | — | 5.340E−10 | 2.784E−09 |
| | M5_1 | — | — | — | — | −2.399E−11 | −2.153E−11 |
| | M6_1 | — | — | — | — | 2.767E−13 | −1.997E−13 |
| | M7_1 | — | — | — | — | 1.964E−15 | 1.737E−15 |
| | M8_1 | — | — | — | — | −9.096E−18 | 3.364E−17 |
| | M9_1 | — | — | — | — | −6.123E−20 | −5.247E−20 |
| | M10_1 | — | — | — | — | −1.768E−22 | −1.366E−21 |
| | C3 | −8.669E−03 | — | — | — | — | — |
| | C5 | −7.847E−03 | — | — | — | — | — |

Figure 10A:
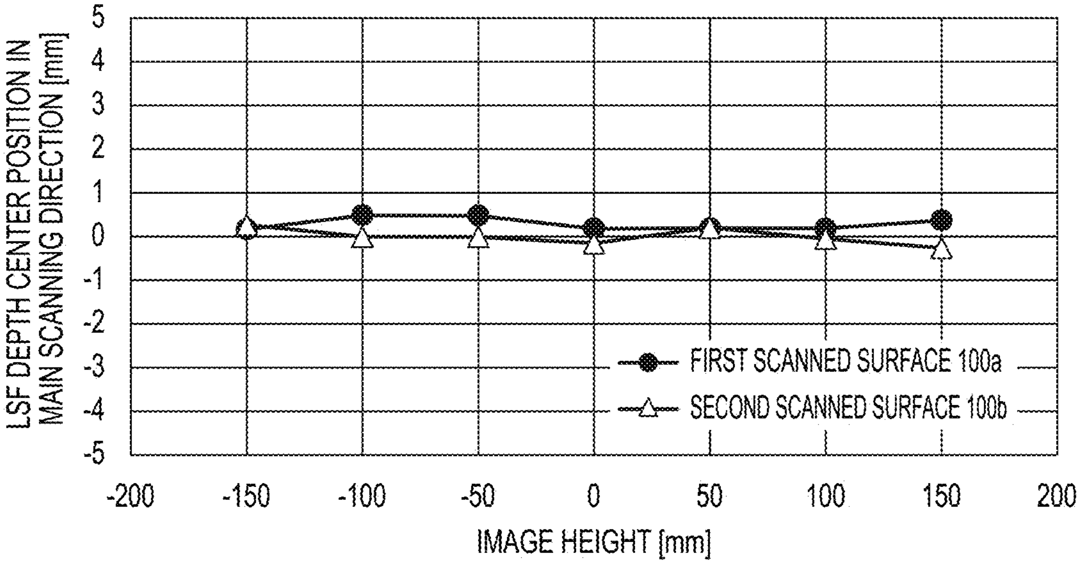
FIG. 10A is a graph for showing image height dependence of the LSF depth center position in the main scanning direction on each scanned surface in the light scanning apparatus according to the second embodiment.
Figure 10B:
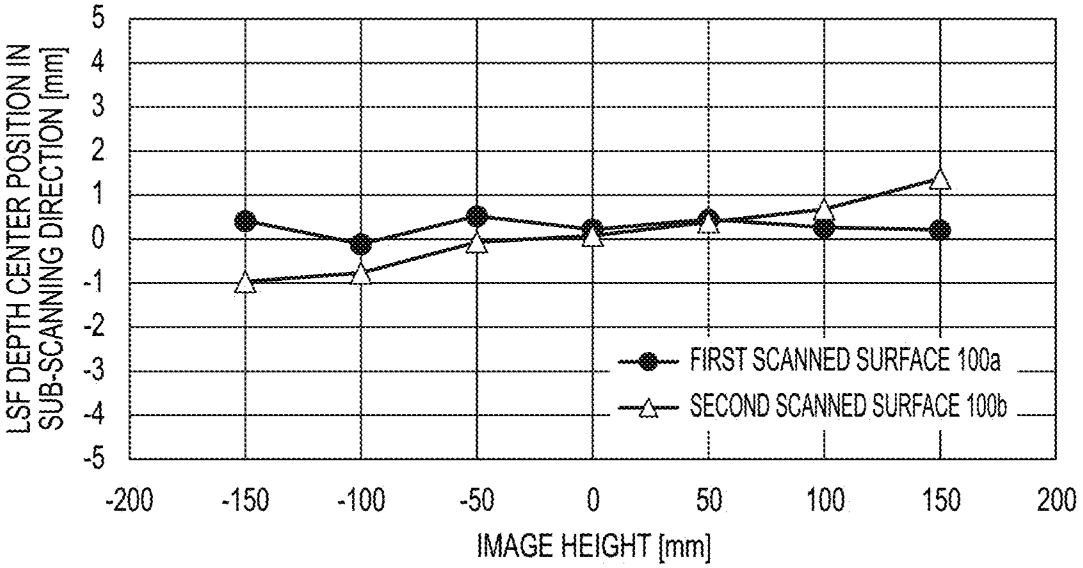
FIG. 10B is a graph for showing image height dependence of the LSF depth center position in the sub-scanning direction on each scanned surface in the light scanning apparatus according to the second embodiment.

FIG. 10A and FIG. 10B show image height dependence of the LSF depth center position in the main scanning direction and of the LSF depth center position in the sub-scanning direction, respectively, on each scanned surface in the light scanning apparatus 201 according to the present embodiment.

As shown in FIG. 10A, the LSF depth center position in the main scanning direction falls within ±1 mm for entire image heights.

As shown in FIG. 10B, the LSF depth center position in the sub-scanning direction falls within ±1 mm for all but some image heights.

The above shows that excellent imaging performance is achieved in the light scanning apparatus 201 according to the present embodiment.

As described above, in the light scanning apparatus 201 according to the present embodiment, the first incident optical element 20*a* and the second reflecting element 90*a* are held by the projecting portion 2*p* integrally formed with the housing 2.

Both of the first incident optical element 20*a* and the second reflecting element 90*a* can thus be held with a simple configuration when downsizing is to be achieved by placing the first incident optical element 20*a* and the second reflecting element 90*a* close to each other.

Third Embodiment

Figure 11A:
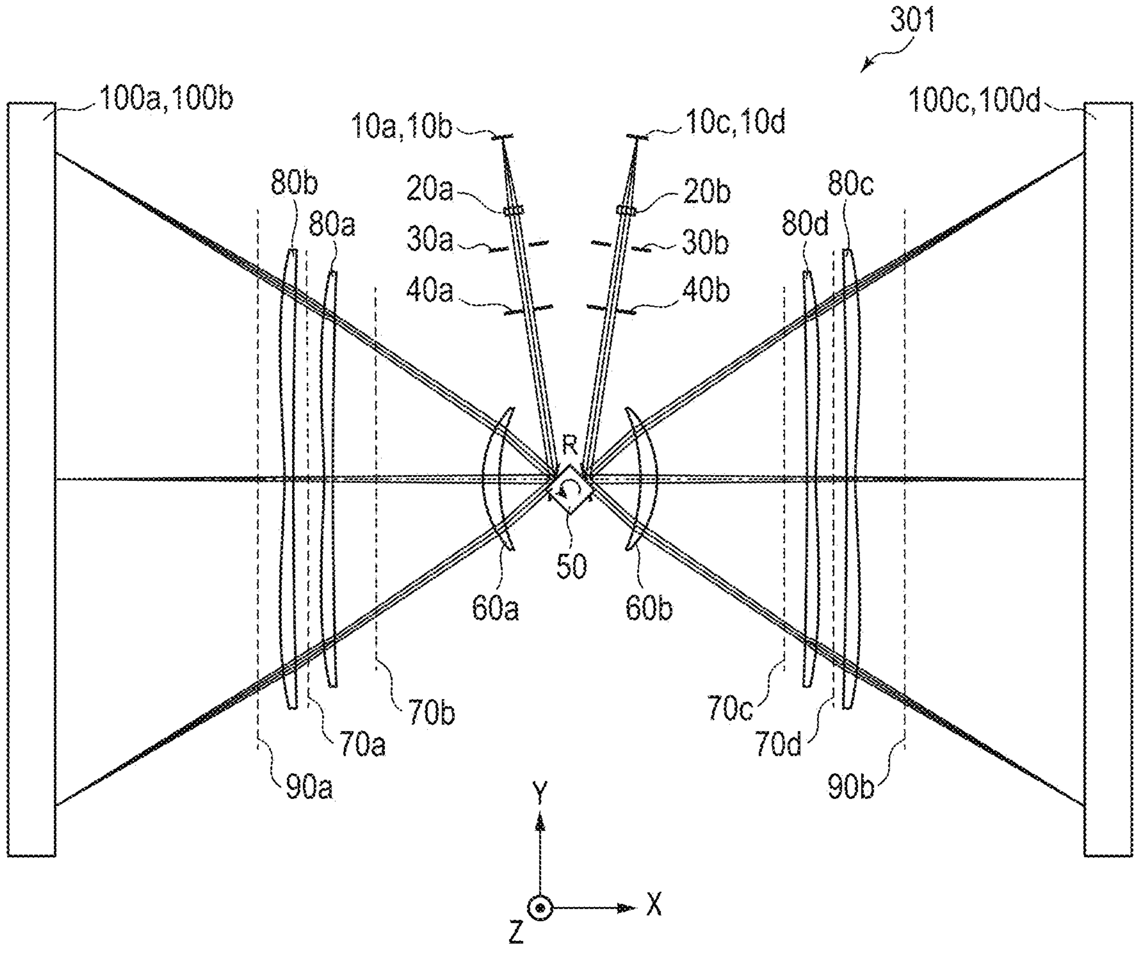
FIG. 11A is a developed view in the main scanning cross section of a light scanning apparatus according to a third embodiment of the present invention.
Figure 11B:
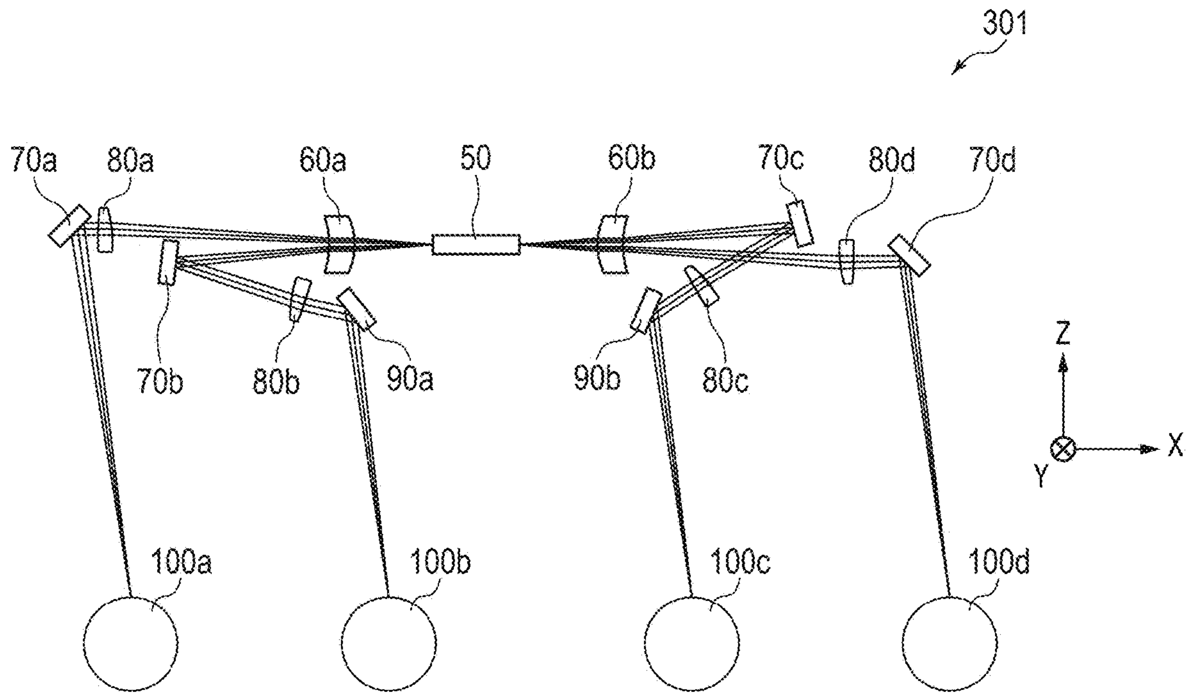
FIG. 11B is a partial sub-scanning cross sectional view of the light scanning apparatus according to the third embodiment.

FIG. 11A and FIG. 11B show a developed view (corresponding to FIG. 1A) in a main scanning cross section of a light scanning apparatus 301 according to a third embodiment of the present invention, and a partial sub-scanning cross sectional view (corresponding to FIG. 1B) thereof, respectively.

Figure 12:
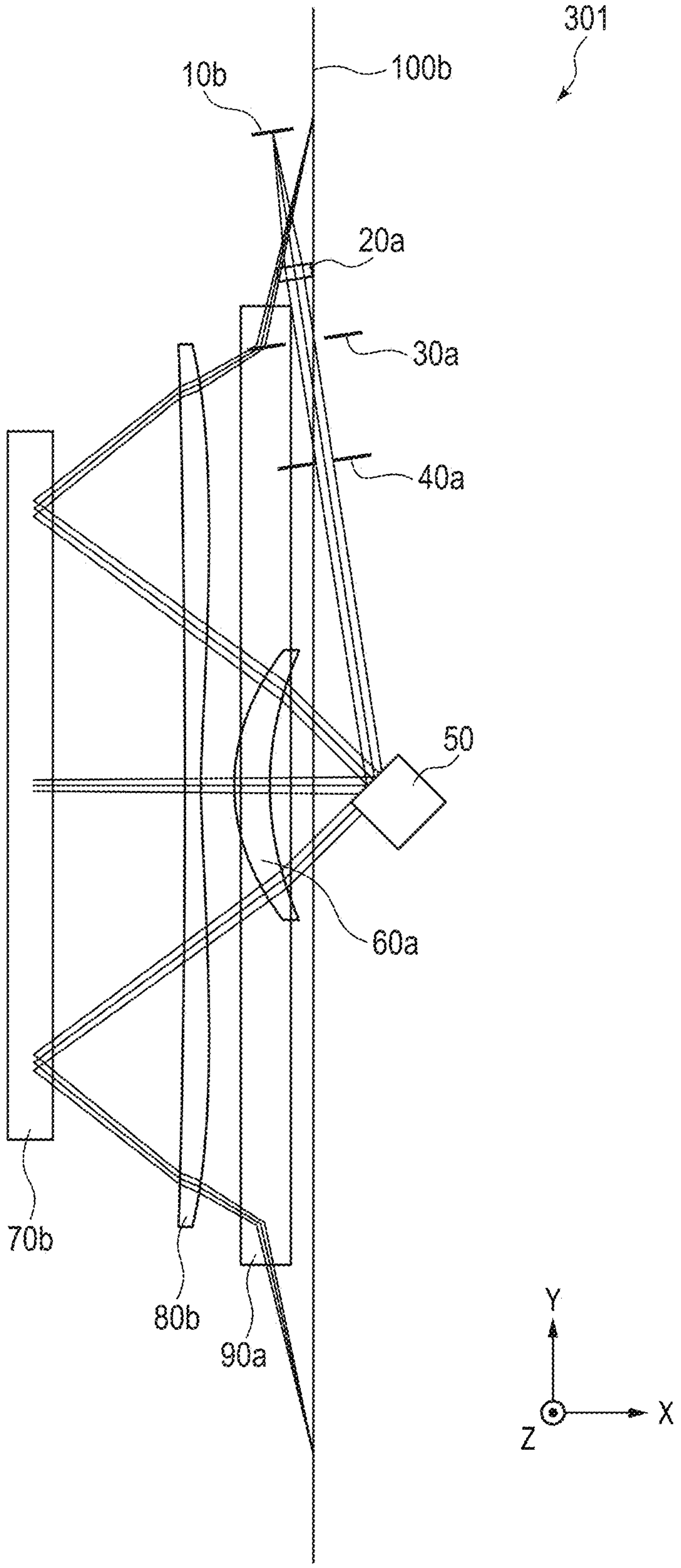
FIG. 12 is a partial projected view in the main scanning cross section of the light scanning apparatus according to the third embodiment.

FIG. 12 shows a partial projected view (corresponding to FIG. 3) in the main scanning cross section of the light scanning apparatus 301 according to the third embodiment.

The light scanning apparatus 301 according to the present embodiment has the same configuration as that of the light scanning apparatus 1 according to the first embodiment, except for differences in various numerical values. Accordingly, the same members are denoted by the same reference numbers, and descriptions thereof are omitted.

Specification values of the light scanning apparatus 301 according to the present embodiment, refractive indices and coordinates of the respective optical elements, and shapes of optical surfaces of the respective optical elements are shown in Table 7, Table 8, and Table 9-1 and Table 9-2, respectively.

In Table 8, Table 9-1, and Table 9-2, information about only the first and second incident optical systems and the first and second imaging optical systems is shown.

That is, in Table 8, Table 9-1, and Table 9-2, information about the third and fourth incident optical systems and the third and fourth imaging optical systems is omitted.

TABLE 7

| Item | Parameter · Unit | Value |
|---|---|---|
| Wavelength used by first to fourth light sources 10a to 10d | λ [nm] | 790 |
| Scanning width of first to fourth scanned surfaces 100a to 100d | h [mm] | 326 |
| Number of deflecting surfaces of deflecting unit 50 | [Surface] | 4 |
| Circumscribed circle diameter of deflecting unit 50 | Pd [mm] | 20 |
| Maximum scanning angle of deflecting unit 50 | θmax [rad] | 0.787 |
| Rotation center coordinates of deflecting unit 50 | (X, Y) [mm] | (5.87, −4.02) |
| Absolute value of incident angle of first to fourth incident optical systems in main scanning cross section | θim [deg] | 81.00 |
| Absolute value of incident angle of first to fourth incident optical systems in sub-scanning cross section | θis [deg] | 2.70 |
| Width of respective aperture portions of first and second sub-scanning stops 30a and 30b in sub-scanning direction | As [mm] | 2.84 |
| Width of respective aperture portions of first and second main scanning stops 40a and 40b in main scanning direction | Am [mm] | 3.75 |

TABLE 7-continued

| Item | Parameter · Unit | Value |
|---|---|---|
| Distance in X-direction between on-axis deflection point C0 and centers of exit surfaces of first and second incident optical elements 20a and 20b | Lx [mm] | 19.71 |
| Distance in Y-direction between on-axis deflection point C0 and centers of exit surfaces of first and second incident optical elements 20a and 20b | Ly [mm] | 124.42 |
| Distance in XY cross section between on-axis deflection point C0 and centers of exit surfaces of first and second incident optical elements 20a and 20b | Lt [mm] | 126.11 |
| Distance in optical axis direction of first to fourth incident optical systems between first to fourth light sources 10a to 10d and on-axis deflection point C0 | Li [mm] | 161.70 |
| Distance in X-direction between on-axis deflection point C0 and centers of reflecting surfaces of second reflecting elements 90a and 90b | Mx [mm] | 27.55 |
| Distance in Y-direction between on-axis deflection point C0 and centers of reflecting surfaces of second reflecting elements 90a and 90b | My [mm] | 116.50 |

TABLE 8

| Surface number | | Surface interval [mm] | Refractive index (λ = 790 nm) | Coordinates of surface vertex tc(x) | tc(y) | tc(z) | Direction cosine of optical axis gx(x) | gx(y) | gx(z) |
|---|---|---|---|---|---|---|---|---|---|
| 1 | First light source 10a | 0.250 | 1.000 | −25.267 | 159.532 | −7.617 | −0.156 | 0.987 | −0.047 |
| 2 | Glass cover for laser chip | 33.340 | 1.511 | −25.228 | 159.285 | −7.605 | −0.156 | 0.987 | −0.047 |
| 3 | Incident surface of lower portion 21al of first incident optical element 20a | 3.000 | 1.528 | −20.019 | 126.392 | −6.035 | −0.156 | 0.987 | −0.047 |
| 4 | Exit surface of lower portion 21al of first incident optical element 20a | 15.150 | 1.000 | −19.550 | 123.433 | −5.893 | −0.156 | 0.987 | −0.047 |
| 5 | Lower aperture portion 30al of first sub-scanning stop 30a | 29.870 | 1.000 | −17.182 | 108.486 | −5.180 | −0.156 | 0.988 | 0.000 |
| 6 | Aperture portion of first main scanning stop 40a | 80.090 | 1.000 | −12.515 | 79.016 | −3.773 | 0.156 | 0.988 | 0.000 |
| 7 | First deflecting surface 50a of deflecting unit 50 (in on-axis image height scanning) | 26.000 | 1.000 | 0.492 | 0.576 | 0.000 | −0.760 | 0.649 | 0.000 |

TABLE 8-continued

| | | | | | | | | | |
|---|---|---|---|---|---|---|---|---|---|
| 8 | Incident surface of upper portion 61a of first imaging optical element 60a | 8.200 | 1.528 | −26.000 | 0.000 | 0.000 | −1.000 | 0.000 | 0.000 |
| 9 | Exit surface of upper portion 61a of first imaging optical element 60a | 69.300 | 1.000 | −34.200 | 0.000 | 0.000 | −1.000 | 0.000 | 0.000 |
| 11 | Incident surface of second imaging optical element 80a | 4.300 | 1.528 | −103.500 | 0.000 | 5.030 | −1.000 | 0.000 | 0.000 |
| 12 | Exit surface of second imaging optical element 80a | 10.670 | 1.000 | −107.800 | 0.000 | 5.030 | −1.000 | 0.000 | 0.000 |
| 13 | Reflecting surface of first reflecting element 70a | 114.530 | 1.000 | −114.192 | 5.000 | 4.980 | −0.759 | 0.000 | 0.652 |
| 14 | First scanned surface 100a | — | 1.000 | −97.695 | 0.000 | −112.686 | −0.151 | 0.000 | 0.989 |
| 1 | Second light source 10b | 0.250 | 1.000 | −25.267 | 159.532 | 7.617 | −0.156 | 0.987 | 0.047 |
| 2 | Glass cover for laser chip | 33.340 | 1.511 | −25.228 | 159.285 | 7.605 | −0.156 | 0.987 | 0.047 |
| 3 | Incident surface of upper portion 21au of first incident optical element 20a | 3.000 | 1.528 | −20.019 | 126.392 | 6.035 | −0.156 | 0.987 | 0.047 |
| 4 | Exit surface of upper portion 21au of first incident optical element 20a | 15.150 | 1.000 | −19.550 | 123.433 | 5.893 | −0.156 | 0.987 | 0.047 |
| 5 | Upper aperture portion 30au of first sub-scanning stop 30a | 29.870 | 1.000 | −17.182 | 108.486 | 5.180 | −0.156 | 0.988 | 0.000 |
| 6 | Aperture portion of first main scanning stop 40a | 80.090 | 1.000 | −12.515 | 79.016 | 3.773 | −0.156 | 0.988 | 0.000 |
| 7 | First deflecting surface 50a of deflecting unit 50 (in on-axis image height scanning) | 26.000 | 1.000 | 0.492 | 0.576 | 0.000 | −0.760 | 0.649 | 0.000 |
| 8 | Incident surface of lower portion 62a of first imaging optical element 60a | 8.200 | 1.528 | −26.000 | 0.000 | 0.000 | −1.000 | 0.000 | 0.000 |
| 9 | Exit surface of lower portion 62a of first imaging optical element 60a | 48.348 | 1.000 | −34.200 | 0.000 | 0.000 | −1.000 | 0.000 | 0.000 |

TABLE 8-continued

| | | | | | | | | | |
|---|---|---|---|---|---|---|---|---|---|
| 10 | Reflecting surface of first reflecting element 70b | 39.452 | 1.000 | −83.252 | 0.000 | −5.275 | −0.991 | 0.000 | 0.132 |
| 11 | Incident surface of second imaging optical element 80b | 4.300 | 1.528 | −46.366 | 0.000 | −17.300 | −0.965 | 0.000 | 0.262 |
| 12 | Exit surface of second imaging optical element 80b | 4.523 | 1.000 | −42.216 | 0.000 | −18.427 | −0.965 | 0.000 | 0.262 |
| 13 | Reflecting surface of second reflecting element 90a | 102.177 | 1.000 | −27.554 | −3.500 | −21.926 | −0.741 | 0.000 | −0.672 |
| 14 | Second scanned surface 100b | — | 1.000 | −14.695 | 0.000 | −112.686 | 0.167 | 0.000 | −0.986 |

TABLE 9-1

| | | Aspherical coefficient | | | | | |
|---|---|---|---|---|---|---|---|
| | | Lower portion 21al of first incident optical element 20a | | Upper portion 61a of first imaging optical element 60a | | Second imaging optical element 80a | |
| | Coefficient | Incident surface | Exit surface | Incident surface | Exit surface | Incident surface | Exit surface |
| Meridional line | R | — | −3.721E+01 | −7.114E+01 | −4.293E+01 | −4.000E+03 | 3.487E+02 |
| | K | — | — | 9.125E−01 | −5.179E−01 | — | −8.539E+01 |
| | B3 | — | — | — | — | — | — |
| | B4 | — | — | −8.821E−07 | −3.506E−07 | — | −2.027E−07 |
| | B5 | — | — | — | — | — | — |
| | B6 | — | — | 6.733E−09 | 1.793E−09 | — | 1.624E−11 |
| | B7 | — | — | — | — | — | — |
| | B8 | — | — | −5.950E−12 | 9.087E−13 | — | −9.361E−16 |
| | B9 | — | — | — | — | — | — |
| | B10 | — | — | 1.780E−15 | −1.182E−15 | — | 2.520E−20 |
| Sagittal line | r | — | −2.596E+01 | 2.000E+01 | 1.320E+01 | 3.640E+01 | −1.219E+02 |
| | E1 | — | — | — | — | — | 6.689E−07 |
| | E2 | — | — | — | 1.551E−05 | −6.129E−07 | 2.191E−06 |
| | E3 | — | — | — | — | — | −2.483E−09 |
| | E4 | — | — | — | −1.778E−08 | — | −3.367E−10 |
| | E5 | — | — | — | — | — | 8.338E−13 |
| | E6 | — | — | — | −1.946E−11 | — | 2.919E−14 |
| | E7 | — | — | — | — | — | −9.455E−17 |
| | E8 | — | — | — | −6.742E−15 | — | −6.591E−19 |
| | E9 | — | — | — | — | — | 2.801E−21 |
| | E10 | — | — | — | 3.937E−17 | — | −4.915E−23 |
| Additional item | M0_1 | — | — | — | 2.383E−02 | −9.872E−02 | 2.561E−02 |
| | M1_1 | — | — | — | — | −2.395E−04 | −2.289E−04 |
| | M2_1 | — | — | — | 4.122E−05 | −1.166E−05 | −2.240E−05 |
| | M3_1 | — | — | — | — | 1.159E−07 | 1.063E−07 |
| | M4_1 | — | — | — | — | 2.040E−09 | 3.845E−09 |
| | M5_1 | — | — | — | — | −1.565E−11 | −1.422E−11 |
| | M6_1 | — | — | — | — | 3.045E−13 | −2.846E−13 |
| | M7_1 | — | — | — | — | 1.049E−15 | 1.065E−15 |
| | M8_1 | — | — | — | — | −1.155E−17 | 6.558E−17 |
| | M9_1 | — | — | — | — | −2.407E−20 | −2.974E−20 |
| | M10_1 | — | — | — | — | −8.105E−22 | −3.747E−21 |
| | C3 | −8.669E−03 | — | — | — | — | — |
| | C5 | −7.847E−03 | — | — | — | — | — |

TABLE 9-2

| | | Aspherical coefficient | | | | | |
|---|---|---|---|---|---|---|---|
| | | Upper portion 21au of first incident optical element 20a | | Lower portion 62a of first imaging optical element 60a | | Second imaging optical element 80b | |
| | Coefficient | Incident surface | Exit surface | Incident surface | Exit surface | Incident surface | Exit surface |
| Meridional line | R | — | −3.721E+01 | −7.114E+01 | −4.384E+01 | 4.000E+03 | −3.787E+02 |
| | K | — | — | 9.125E−01 | −9.255E−01 | — | −7.507E+01 |
| | B3 | — | — | — | — | — | — |
| | B4 | — | — | −8.821E−07 | −1.361E−06 | — | 1.315E−07 |
| | B5 | — | — | — | — | — | — |
| | B6 | — | — | 6.733E−09 | 1.798E−09 | — | −6.888E−12 |
| | B7 | — | — | — | — | — | — |
| | B8 | — | — | −5.950E−12 | 7.873E−13 | — | 2.707E−16 |
| | B9 | — | — | — | — | — | — |
| | B10 | — | — | 1.780E−15 | −1.100E−15 | — | −4.794E−21 |
| Sagittal line | r | — | −2.596E+01 | 2.000E+01 | 1.337E+01 | −4.061E+01 | 1.029E+02 |
| | E1 | — | — | — | — | — | — |
| | E2 | — | — | — | −3.012E−05 | 3.266E−07 | −1.807E−06 |
| | E3 | — | — | — | — | — | — |
| | E4 | — | — | — | 1.604E−07 | — | 3.110E−10 |
| | E5 | — | — | — | — | — | — |
| | E6 | — | — | — | −4.008E−10 | — | −4.083E−14 |
| | E7 | — | — | — | — | — | — |
| | E8 | — | — | — | 3.956E−13 | — | 3.025E−18 |
| | E9 | — | — | — | — | — | — |
| | E10 | — | — | — | −1.318E−16 | — | −8.886E−23 |
| Additional item | M0_1 | — | — | — | 7.657E−03 | −1.127E−01 | 6.735E−02 |
| | M1_1 | — | — | — | — | −3.558E−04 | −3.438E−04 |
| | M2_1 | — | — | — | −3.968E−05 | −8.073E−06 | −2.053E−05 |
| | M3_1 | — | — | — | — | 1.504E−07 | 1.392E−07 |
| | M4_1 | — | — | — | — | 8.447E−10 | 2.994E−09 |
| | M5_1 | — | — | — | — | −2.388E−11 | −2.139E−11 |
| | M6_1 | — | — | — | — | 2.688E−13 | −1.934E−13 |
| | M7_1 | — | — | — | — | 1.942E−15 | 1.707E−15 |
| | M8_1 | — | — | — | — | −9.832E−18 | 3.319E−17 |
| | M9_1 | — | — | — | — | −6.019E−20 | −5.082E−20 |
| | M10_1 | — | — | — | — | 1.051E−22 | −1.313E−21 |
| | C3 | −8.669E−03 | — | — | — | — | — |
| | C5 | −7.847E−03 | — | — | — | — | — |

Figure 13A:
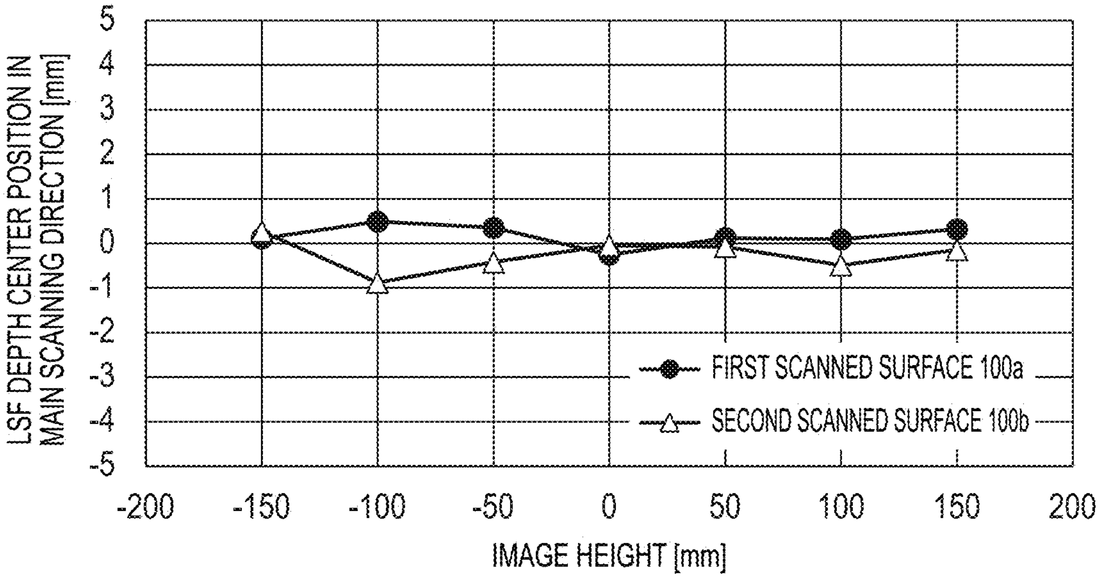
FIG. 13A is a graph for showing image height dependence of the LSF depth center position in the main scanning direction on each scanned surface in the light scanning apparatus according to the third embodiment.
Figure 13B:
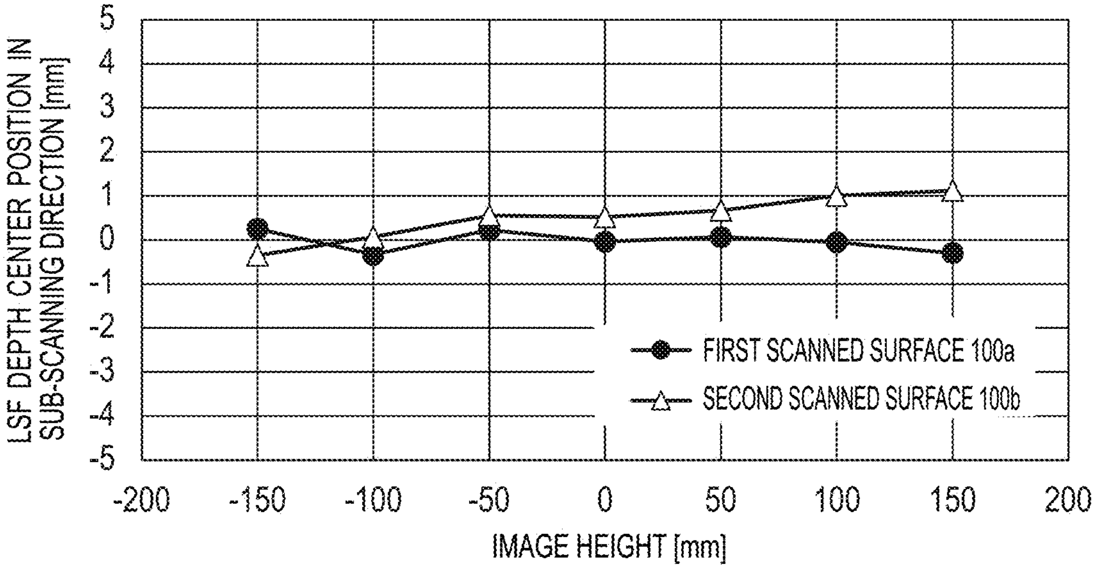
FIG. 13B is a graph for showing image height dependence of the LSF depth center position in the sub-scanning direction on each scanned surface in the light scanning apparatus according to the third embodiment.

FIG. 13A and FIG. 13B show image height dependence of the LSF depth center position in the main scanning direction and of the LSF depth center position in the sub-scanning direction, respectively, on each scanned surface in the light scanning apparatus 301 according to the present embodiment.

As shown in FIG. 13A, the LSF depth center position in the main scanning direction falls within ±1 mm for entire image heights.

As shown in FIG. 13B, the LSF depth center position in the sub-scanning direction falls within ±1 mm for all but some image heights.

The above shows that excellent imaging performance is achieved in the light scanning apparatus 301 according to the present embodiment.

As described above, in the light scanning apparatus 301 according to the present embodiment, the first incident optical element 20*a* and the second reflecting element 90*a* are held by the projecting portion 2*p* integrally formed with the housing 2.

Both of the first incident optical element 20*a* and the second reflecting element 90*a* can thus be held with a simple configuration when downsizing is to be achieved by placing the first incident optical element 20*a* and the second reflecting element 90*a* close to each other.

Relationships between the various numerical values and Inequalities in respective light scanning apparatuses according to the first to third embodiments of the present invention are shown in Table 10 below.

TABLE 10

| | Inequality | First Embodiment | Second Embodiment | Third Embodiment |
|---|---|---|---|---|
| (5) | $0.500 < M_X/L_X < 1.500$ | 1.060 | 0.800 | 1.398 |
| (5a) | $0.700 < M_X/L_X < 1.400$ | | | |
| (6) | $0.9000 < M_Y/L_Y < 0.9700$ | 0.9530 | 0.9698 | 0.9363 |
| (6a) | $0.9300 < M_Y/L_Y < 0.9700$ | | | |
| (7) | $0.70 < L_i/L_j < 0.90$ | 0.77 | 0.77 | 0.78 |
| (7a) | $0.75 < L_i/L_j < 0.85$ | | | |

According to the present embodiments, a light scanning apparatus that has achieved downsizing with a simple configuration can be provided.

[Image Forming Apparatus]

Figure 14:
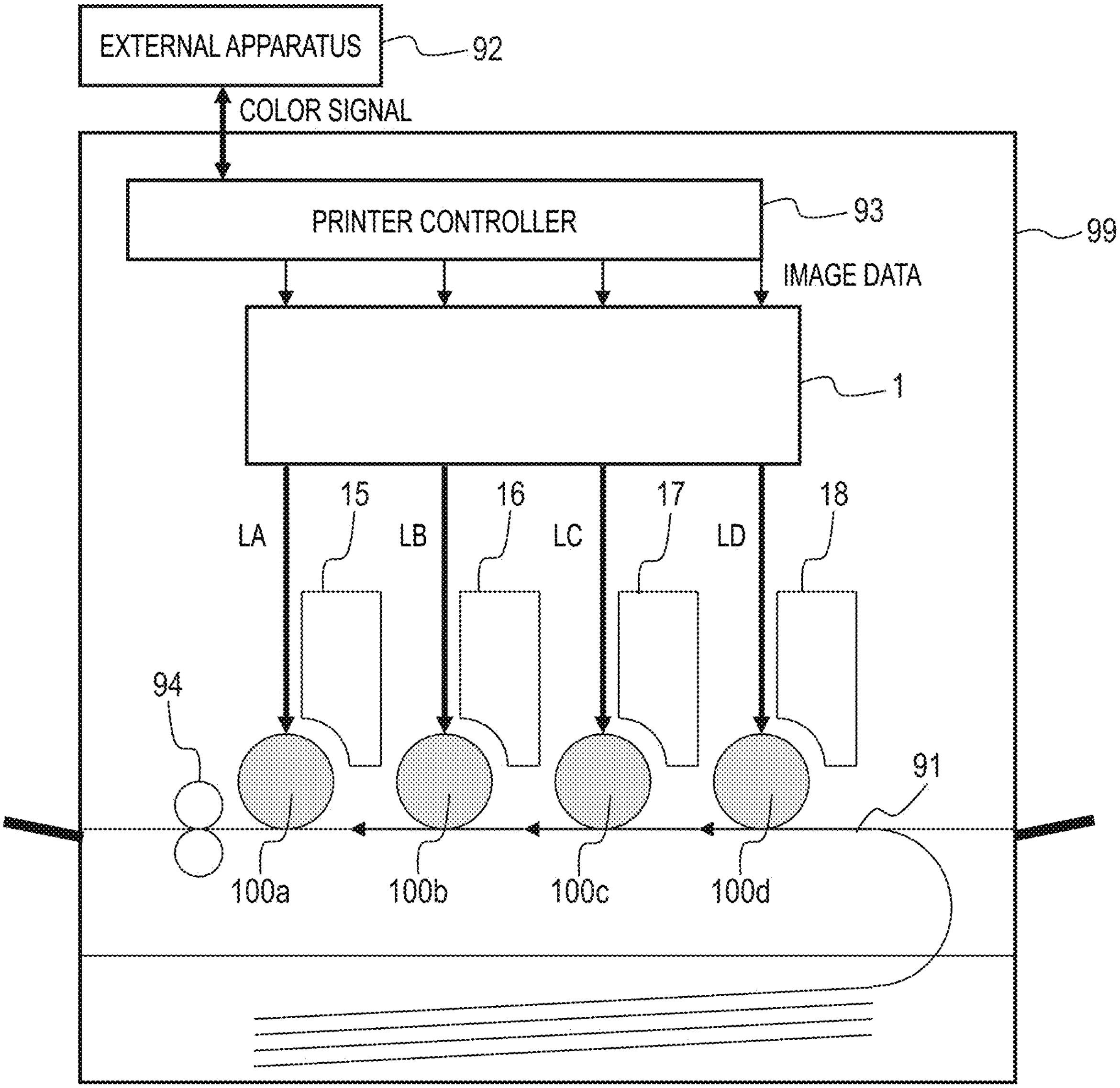
FIG. 14 is a sub-scanning cross sectional view of a main part of an image forming apparatus according to the present embodiments.

FIG. 14 shows a sub-scanning cross sectional view of a main part of an image forming apparatus 99 including the light scanning apparatus 1 according to any one of the first to third embodiments.

The image forming apparatus 99 is a tandem-type color image forming apparatus in which the light scanning apparatus 1 according to any one of the first to third embodiments records image information on surfaces (scanned surfaces) of four photosensitive drums each of which is an image bearing member.

The image forming apparatus 99 includes the light scanning apparatus 1 according to any one of the first to third embodiments and first, second, third, and fourth photosensitive drums 100*a*, 100*b*, 100*c*, and 100*d* serving as image bearing members.

The image forming apparatus 99 also includes first, second, third, and fourth developing units 15, 16, 17, and 18, a conveying belt 91, a printer controller 93, and a fixing unit 94.

As illustrated in FIG. 14, color signals of red (R), green (G), and blue (B) output from an external apparatus 92, for example, a personal computer is input to the image forming apparatus 99.

Those input color signals are then converted into pieces of image data (dot data) on cyan (C), magenta (M), yellow (Y), and black (K) by the printer controller 93 in the image forming apparatus 99.

Next, the pieces of image data generated by the conversion are input to the light scanning apparatus 1 according to any one of the first to third embodiments.

The first, second, third, and fourth light fluxes LA, LB, LC, and LD modulated based on the pieces of image data are emitted from the light scanning apparatus 1, and photosensitive surfaces of the first to fourth photosensitive drums 100*a* to 100*d* are scanned with the first, second, third, and fourth light fluxes LA, LB, LC, and LD in the main scanning direction.

Charging rollers (not shown) which uniformly charge the photosensitive surfaces of the first to fourth photosensitive drums 100*a* to 100*d* are provided so as to be brought into abutment against the photosensitive surfaces.

The light scanning apparatus 1 then irradiates, with the first to fourth light fluxes LA to LD, the photosensitive surfaces of the first to fourth photosensitive drums 100*a* to 100*d* charged by the charging rollers.

As described above, the first to fourth light fluxes LA to LD have been modulated based on the pieces of image data of the respective colors, and electrostatic latent images are formed on the respective photosensitive surfaces of the first to fourth photosensitive drums 100*a* to 100*d*, by irradiating the photosensitive surfaces with the first to fourth light fluxes LA to LD.

The formed electrostatic latent images are developed as toner images by the first to fourth developing units 15 to 18 arranged so as to abut against the first to fourth photosensitive drums 100*a* to 100*d*, respectively.

Next, the developed toner images are transferred onto a sheet (a transferred material) (not shown) being conveyed on the conveying belt 91 in a superimposed manner by transferring rollers (transferring unit) (not shown) arranged so as to be opposed to the first to fourth photosensitive drums 100*a* to 100*d*. One full-color image is thus formed on the sheet.

The sheet onto which the unfixed toner images have been transferred is further conveyed by the conveying belt 91 to the fixing unit 94 provided downstream (on the left side of FIG. 14) of the first to fourth photosensitive drums 100*a* to 100*d*.

The fixing unit 94 includes a fixing roller containing a fixing heater (not shown) therein, and a pressurizing roller arranged so as to be brought into pressure contact with the fixing roller.

The unfixed toner images on the sheet are fixed by heating, under pressure applied from a pressure contact portion between the fixing roller and the pressurizing roller, the sheet having been conveyed by the conveying belt 91.

Discharging rollers (not shown) are further provided downstream of the fixing unit 94, and discharge the sheet onto which the toner images have been fixed to the outside of the image forming apparatus 99.

In the image forming apparatus 99, the light scanning apparatus 1 records image signals (image information) on the photosensitive surfaces of the first to fourth photosensitive drums 100*a* to 100*d* each corresponding to one of colors of cyan (C), magenta (M), Y (yellow), and K (black). A color image can thus be printed at high speed.

As the external apparatus 92, for example, a color image reading apparatus including a CCD sensor may be used.

In this case, this color image reading apparatus and the image forming apparatus 99 form a color digital copying machine.

While the embodiments of the present invention have been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-166649, filed Sep. 28, 2023, which is hereby incorporated by reference herein in its entirety.

What is claimed is:

1. A light scanning apparatus comprising:

a deflecting unit configured to deflect a first light flux from a first light source to scan a first scanned surface in a main scanning direction;

a first imaging optical system configured to guide the first light flux deflected by the deflecting unit to the first scanned surface;

a reflecting element configured to reflect the first light flux, and arranged on an optical path between the deflecting unit and the first scanned surface;

an optical element configured to guide the first light flux emitted from the first light source to the deflecting unit; and a holding member configured to hold the deflecting unit, the first imaging optical system, the reflecting element, and the optical element, wherein the optical element and the reflecting element abut against the holding member, and wherein the optical element is arranged on a line extending in the main scanning direction from the reflecting element when they are projected in a main scanning cross section.

2. The light scanning apparatus according to claim 1, wherein the holding member includes a first holding portion extending in a sub-scanning direction, and the optical element and the reflecting element abut against the first holding portion.

3. The light scanning apparatus according to claim 2, wherein the first holding portion is provided with a first aperture portion configured to regulate the first light flux in the sub-scanning direction.

4. The light scanning apparatus according to claim 2, wherein the first holding portion includes a plurality of protruding portions which abut against a surface on a deflecting unit side of the optical element.

5. The light scanning apparatus according to claim 4, wherein the holding member includes a biasing portion configured to bias the optical element toward the plurality of protruding portions.

6. The light scanning apparatus according to claim 4, wherein the plurality of protruding portions differ from one another in length in the main scanning cross section.

7. The light scanning apparatus according to claim 4, wherein the surface on the deflecting unit side of the optical element includes a plurality of protruding portions which abut against the plurality of protruding portions.

8. The light scanning apparatus according to claim 2, wherein the optical element abuts against the first holding portion in the main scanning direction, and the reflecting element abuts against the first holding portion in the sub-scanning direction.

9. The light scanning apparatus according to claim 2,
wherein the holding member includes a housing in which the deflecting unit, the first imaging optical system, the reflecting element, and the optical element are arranged, and
wherein the first holding portion projects from a bottom surface of the housing in the sub- scanning direction.

10. The light scanning apparatus according to claim 1, wherein the optical element is configured to convert a degree of convergence of the first light flux in a main scanning cross section, and to condense the first light flux in a sub-scanning cross section.

11. The light scanning apparatus according to claim 1, further comprising a second imaging optical system configured to guide a second light flux deflected by the deflecting unit to a second scanned surface,
wherein the deflecting unit is configured to deflect the first light flux and the second light flux by a first deflecting surface to scan the first scanned surface and the second scanned surface in the main scanning direction, respectively, and
wherein the optical element includes a first optical portion configured to guide the first light flux to the first deflecting surface, and a second optical portion configured to guide the second light flux to the first deflecting surface.

12. The light scanning apparatus according to claim 11, wherein the holding member includes a first holding portion extending in a sub-scanning direction, the optical element and the reflecting element abut against the first holding portion, and the first holding portion is provided with a first aperture portion and a second aperture portion which are configured to regulate the first light flux and the second light flux in the sub-scanning direction.

13. The light scanning apparatus according to claim 1, further comprising a second imaging optical system configured to guide a second light flux deflected by the deflecting unit to a second scanned surface,
wherein the deflecting unit is configured to deflect the first light flux and the second light flux by a first deflecting surface to scan the first scanned surface and the second scanned surface in the main scanning direction, respectively, and
wherein the following condition is satisfied:
$0.500<M_X/L_X<1.500$,
where $L_X$ represents a distance in a first direction between an on-axis deflection point of the first light flux on the first deflecting surface and a center of a surface of the optical element which abuts against the holding member, the first direction being parallel to a straight line running through a first intersection of the first scanned surface and an optical axis of the first imaging optical system, and a second intersection of the second scanned surface and an optical axis of the second imaging optical system, and $M_X$ represents a distance in the first direction between the on-axis deflection point and a center of a reflecting surface of the reflecting element.

14. The light scanning apparatus according to claim 1, wherein the following condition is satisfied:
$0.900<M_Y/L_Y<0.9700$,
where $L_Y$ represents a distance in the main scanning direction between an on-axis deflection point of the first light flux in the deflecting unit and a center of a surface of the optical element which abuts against the holding member, and $M_Y$ represents a distance in the main scanning direction between the on-axis deflection point and an end portion of the reflecting element which is closest to the optical element.

15. The light scanning apparatus according to claim 1, wherein the following condition is satisfied:
$0.70<L_t/L_i<0.90$,
where $L_t$ represents a distance in a main scanning cross section between an on-axis deflection point of the first light flux in the deflecting unit and a center of a surface of the optical element which abuts against the holding member, and $L_i$ represents a distance in a direction parallel to an optical axis of the optical element between the first light source and the on-axis deflection point.

16. The light scanning apparatus according to claim 1, further comprising a second imaging optical system, a third imaging optical system, and a fourth imaging optical system which are configured to guide a second light flux, a third light flux, and a fourth light flux which are deflected by the deflecting unit to a second scanned surface, a third scanned surface, and a fourth scanned surface, respectively,
wherein the deflecting unit is configured to deflect the second light flux, the third light flux, and the fourth light flux to scan the second scanned surface, the third scanned surface, and the fourth scanned surface in the main scanning direction, respectively,
wherein the first light flux and the second light flux are incident on a first deflecting surface of the deflecting unit at angles different from each other with respect to a main scanning cross section in a sub-scanning cross section, and
wherein the third light flux and the fourth light flux are incident on a second deflecting surface of the deflecting unit at angles different from each other with respect to the main scanning cross section in the sub-scanning cross section.

17. An image forming apparatus comprising:
the light scanning apparatus according to claim 1;
a developing unit configured to develop, as a toner image, an electrostatic latent image formed by the light scanning apparatus on the first scanned surface;
a transferring unit configured to transfer the developed toner image onto a transferred material; and
a fixing unit configured to fix the transferred toner image to the transferred material.

18. An image forming apparatus comprising:
the light scanning apparatus according to claim 1; and
a printer controller configured to convert a signal output from an external apparatus into image data to input the image data to the light scanning apparatus.

19. A light scanning apparatus comprising:
a deflecting unit configured to deflect a first light flux from a first light source to scan a first scanned surface in a main scanning direction;

a first imaging optical system and a reflecting element which are configured to guide the first light flux deflected by the deflecting unit to the first scanned surface;

an optical element configured to guide the first light flux emitted from the first light source to the deflecting unit; and a holding member configured to hold the deflecting unit, the first imaging optical system, the reflecting element, and the optical element, wherein the holding member includes a first holding portion extending in a sub-scanning direction, wherein the optical element and the reflecting element abut against the first holding portion, and wherein the first holding portion is provided with a first aperture portion configured to regulate the first light flux in the sub-scanning direction.

20. A light scanning apparatus comprising:

a deflecting unit configured to deflect a first light flux from a first light source to scan a first scanned surface in a main scanning direction;

a first imaging optical system and a reflecting element which are configured to guide the first light flux deflected by the deflecting unit to the first scanned surface;

an optical element configured to guide the first light flux emitted from the first light source to the deflecting unit; and a holding member configured to hold the deflecting unit, the first imaging optical system, the reflecting element, and the optical element, wherein the holding member includes a first holding portion extending in a sub-scanning direction, wherein the optical element and the reflecting element abut against the first holding portion, and wherein the first holding portion includes a plurality of protruding portions which abut against a surface on a deflecting unit side of the optical element.

* * * * *